United States Patent
Martinez et al.

(10) Patent No.: US 7,627,745 B2
(45) Date of Patent: Dec. 1, 2009

(54) METHOD, SYSTEM AND PROGRAM PRODUCT FOR VERIFYING CONFIGURATION OF A COMPUTER SYSTEM

(75) Inventors: Bernard J. Martinez, Firestone, CO (US); Richard M. Ross, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 493 days.

(21) Appl. No.: 11/479,648

(22) Filed: Jun. 30, 2006

(65) Prior Publication Data

US 2008/0126773 A1    May 29, 2008

(51) Int. Cl.
*G06F 15/173* (2006.01)

(52) U.S. Cl. .............................. 713/2; 713/1; 709/220; 709/223

(58) Field of Classification Search ...................... 713/1, 713/2; 709/220, 223
See application file for complete search history.

(56) References Cited

U.S. PATENT DOCUMENTS

| | | | |
|---|---|---|---|
| 5,745,669 A * | 4/1998 | Hugard et al. ................... 714/3 | |
| 6,901,534 B2 | 5/2005 | Carr | |
| 6,931,440 B1 | 8/2005 | Blumenau et al. | |
| 6,941,453 B2 | 9/2005 | Rao | |
| 2002/0133695 A1 | 9/2002 | Khatri et al. | |
| 2003/0149756 A1 * | 8/2003 | Grieve et al. ................. 709/223 |
| 2004/0044693 A1 * | 3/2004 | Hadley et al. ................ 707/200 |
| 2006/0041658 A1 | 2/2006 | Nelson et al. | |
| 2007/0162720 A1 * | 7/2007 | Branda et al. ................ 711/173 |
| 2008/0232273 A1 * | 9/2008 | Beckett et al. ............... 370/254 |

* cited by examiner

*Primary Examiner*—Abdelmoniem Elamin
(74) *Attorney, Agent, or Firm*—Silvy Anna Murphy; Arthur J. Samodovitz

(57) ABSTRACT

A method, system and program product for verifying configuration of a computer system is disclosed. The method includes generating, using a configuration snapshot tool, first and second configuration snapshots of relevant components of a computer system taken at a first and a second point-in-time, respectively, and comparing data in the first configuration snapshot to data in the second configuration snapshot to identify any critical and significant configuration changes while excluding identifying any insignificant configuration changes that do not significantly effect an acceptable level of operation and an intended purpose of the computer system. The method includes alerting as to any critical configuration changes identified, while informing as to any significant configuration changes identified for the computer system. The method further includes defining in a configuration file all the relevant components whose configuration is to be verified, such that relevant components can be added and non-relevant components can be deleted.

20 Claims, 13 Drawing Sheets

METHOD, SYSTEM AND PROGRAM PRODUCT FOR VERIFYING CONFIGURATION OF A COMPUTER SYSTEM

FIELD OF THE INVENTION

The present invention relates to a method, system and computer program product for verifying configuration of a computer system. More particularly, the present invention relates to a method, system and computer program product for verifying configuration of relevant components of a computer system by identifying critical and significant changes in configuration while excluding insignificant changes that do not significantly effect an acceptable level of operation and an intended purpose of the computer system.

BACKGROUND OF THE INVENTION

In today's business environment, organizations and/or businesses utilize computer systems that are networked and are coupled to numerous devices and have numerous processes that are run on these systems. Managing these networked computer systems is a huge undertaking given that administrators who support these systems have to keep track of all the configurations of these numerous devices and the numerous processes that run on the systems to ensure that the systems are working properly. As such, there is a need for an efficient way to track configuration information pertaining to a computer system in order to ensure that the system is working at an acceptable level, without negatively impacting the performance delivered or expected of the computer system.

SUMMARY OF THE INVENTION

In a first aspect of the invention, there is provided a method for verifying configuration of a computer system. The method includes generating a first point-in-time configuration snapshot containing a first set of configuration data corresponding to a first configuration of each of a set of relevant components of a computer system checked at a first point-in-time, the first point-in-time configuration snapshot being written to a status file, and generating a second point-in-time configuration snapshot containing a second set of configuration data corresponding to a second configuration of the each of the set of relevant components of the computer system checked at a second point-in-time. In an embodiment, each of the generating steps includes providing a configuration snapshot tool for generating the first point-in-time configuration snapshot and the second point-in-time configuration snapshot for the computer system. Further, in an embodiment, each of the generating steps includes running a component script corresponding to a component of the set of relevant components defined for the computer system whose configuration is to be verified. The method further includes comparing the first set of configuration data to the second set of configuration data to identify one or more critical configuration changes and to identify one or more significant configuration changes and to exclude identifying any insignificant configuration changes that do not significantly effect an acceptable level of operation and an intended purpose of the computer system, and alerting as to each of the one or more critical configuration changes identified, while informing as to each of the one or more significant configuration changes identified for the computer system. The method further includes defining in a configuration file each of the set of relevant components whose configuration data is to be checked by the configuration snapshot tool for generating each of the first point-in-time configuration snapshot and the second point-in-time configuration snapshot for the computer system. In an embodiment, the defining step further includes adding one or more new relevant components to the set of relevant components defined in the configuration file for verifying configuration of each of the one or more new relevant components added. In an embodiment, the defining step further includes deleting one or more existing components from the set of relevant components defined in the configuration file for excluding verifying configuration of each of the one or more existing components deleted. In an embodiment, the comparing step further includes identifying one or more dynamic routes that may have changed from the first point in time configuration snapshot to the second point in time configuration snapshot, wherein the one or more dynamic routes do not cause any corresponding loss in function associated with the one or more dynamic routes, and identifying one or more persistent routes that should remain the same from the first point in time configuration snapshot to the second point in time configuration snapshot in order to prevent any corresponding loss in function associated with the one or more persistent routes. In an embodiment, the set of relevant components includes at least one of: operating system components, hardware components, disk storage components and network components, and, in an embodiment, the first point-in-time configuration snapshot is before a reboot of the system, and wherein the second point-in-time configuration snapshot is after a reboot of the system.

In another aspect of the invention, there is provided a system for checking configuration of a server on a computer network. The system includes a plurality of servers coupled to a computer network, each server of the plurality of servers includes of one or more relevant components for performing an intended function of the each server, and a configuration snapshot tool for creating an initial point-in-time configuration snapshot of a server of the plurality of servers in the computer network, the configuration snapshot tool being configured to run on the server and to exclude in creating the initial point-in-time configuration snapshot any non-relevant components of the one or more relevant components of the server that do not effect the intended function of the remote server, the configuration snapshot tool being configured to compare the initial point-in-time configuration snapshot to a later point-in-time configuration snapshot in order to identify any critical configuration changes and any significant configuration changes in the one or more relevant components that may affect the intended function of the server, wherein the initial point-in-time configuration snapshot is before a reboot of the server and wherein the later point-in-time configuration snapshot is after a reboot of the server. In an embodiment, the configuration snapshot tool is further configured to read from a configuration file that specifies a list of the one or more relevant components whose configuration is to be checked for creating the initial point-in-time configuration snapshot and the later point-in-time configuration snapshot of the server. Further, the configuration snapshot tool is configured to run a component script corresponding to a relevant component of the set of relevant components whose configuration is to be checked. In an embodiment, the configuration snapshot tool is further configured to add one or more additional components to the set of relevant components specified in the configuration file for verifying configuration of the one or more additional components added. In an embodiment, the configuration snapshot tool is further configured to delete one or more existing components from the set of relevant components specified in the configuration file for excluding verifying configuration of each of the one or more existing components deleted. In an embodiment, the set of relevant components includes at least one of: operating system components, hardware components, disk storage components and network components.

In yet another embodiment, the present invention provides a computer program product for checking configuration of a system. The computer program product includes a computer readable medium, first program instructions to generate, using a configuration checking tool, an initial point-in-time configuration snapshot of a system among a plurality of systems connected via a network, the configuration checking tool including in the initial point-in-time configuration snapshot each relevant component among a set of relevant components of the system that affects a functional level of operation of the system, second program instructions to run the configuration checking tool at a later time to generate a later point-in-time configuration snapshot of the system, the second program instructions include instructions to compare the later point-in-time configuration snapshot to the initial point-in-time configuration snapshot to identify one or more critical configuration changes and to identify one or more significant configuration changes to any relevant component among the set of relevant components from the initial point-in-time configuration snapshot to the later point-in-time configuration snapshot, and third program instructions to alert, using specific error messages, of the one or more critical configuration changes identified and to inform, using specific warning messages, of the one or more significant configuration changes identified for the system, the instructions excluding identifying any insignificant configuration changes that do not significantly affect the functional level of operation of the system. The computer program product further includes fourth program instructions to define in a configuration file the set of relevant components whose configuration is to be checked by the configuration snapshot tool, the fourth program instructions including instructions to add a component to the configuration file and instructions to delete a component from the configuration file. In an embodiment, the first program instructions include instructions to run a component script corresponding to a component of the set of relevant components defined for the computer system whose configuration is to be checked. In an embodiment, the second program instructions include instructions to check dynamic and persistent routes, to check communication to default gateways and servers, to check system clock, to check error log for hardware and software errors, to check load balancing systems, and to check failover systems. In an embodiment, each of the first, second, third and fourth program instructions are stored on the computer readable medium. In an embodiment, the initial point-in-time configuration snapshot is before a reboot of the system, and wherein the later point-in-time configuration snapshot is after a reboot of the system. In an embodiment, the set of relevant components includes at least one of: operating system components, hardware components, disk storage components and network components.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
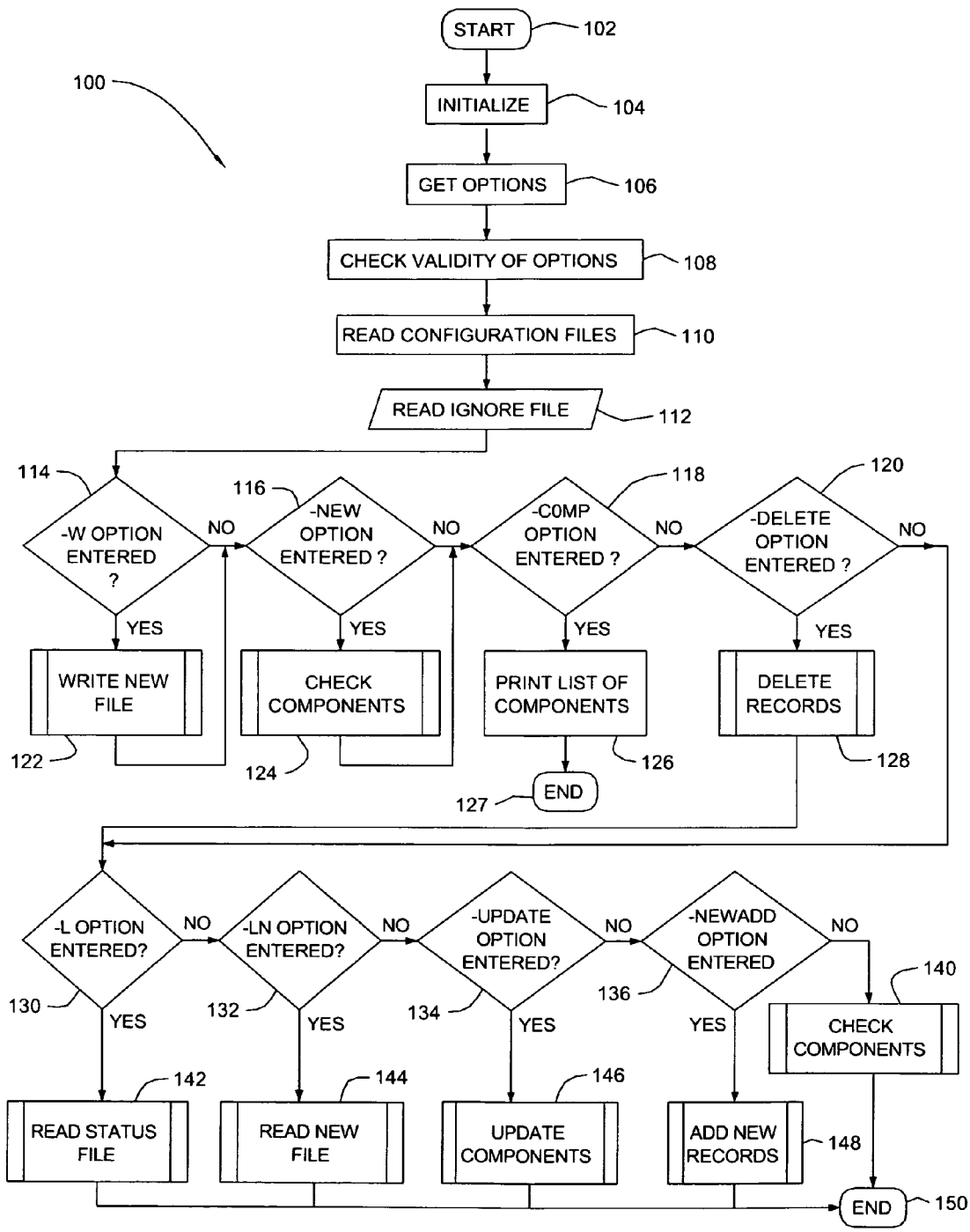
FIG. 1 is a flowchart depicting a method for verifying configuration of a computer system, in accordance with an embodiment of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network.

Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In an embodiment, the invention provides a method of verifying configuration of a computer system. The method is carried out by running a configuration snapshot tool or program that generates a configuration snapshot that includes configuration data for each relevant component and/or sub-component of a computer system, with the snapshot being logged or stored or written to a configuration status file (herein referred to as "status file"). The relevant component and/or sub-components are specified or defined in one or more configuration files. In an embodiment, the set of relevant components includes at least one of: operating system components, hardware components, disk storage components and network components. The information stored in the status file is used to verify the configuration of the computer system at a later point in time, such as, after a reboot or after a scheduled maintenance event. In particular, the configuration snapshot tool is run again and another configuration snapshot of the computer system is generated. The two configuration snapshots are compared to identify any critical or significant configuration changes in any of the relevant components and/or sub-components. Moreover, any insignificant configuration changes that do not significantly effect an acceptable level of operation and an intended purpose of the computer system are ignored. Further, the configuration snapshot tool alerts a user (using specific error messages) of any critical configuration changes that are identified and also informs the user (using specific warning messages) of any significant configuration changes identified for the computer system. Critical differences are those configuration differences or changes identified that would deem the computer system or applications on the computer system unusable. For instance, if a computer system is a web server that serves web pages and the process or application that serves web pages is not running, then the application on the system is basically unusable since the process significantly impacts the functional operation of the web server. Similarly, if processes on a database server are not running, then the database server cannot carry out its intended purpose. Another example of a critical difference is if an error is found in the system clock date where the previously logged date stamp is newer that the current date stamp. Since the system clock is critical in areas such as tracking, backing up and/or restoring a system, any issues as to a system clock not moving forward are critical to a system and, hence, would need to be reset. Further yet, another example of a critical difference is if there are errors with respect to the set up of network interfaces in a configuration file to be pinged, such that network connectivity becomes unavailable, which would render the system unusable. On the other hand, significant differences are those configuration differences identified that may cause some degradation of the computer system or applications, but the computer system would still be usable. For example, if a computer system has 2 GB of memory installed, but only 1 GB is found, the system would still be usable but may be degraded. Another example of a significant difference is if a computer system has 4 CPU processors installed but only 3 are found. The system would still be usable but may be degraded. Further yet, another example of a significant difference is if a specific filesystem (where data is stored) is missing from the list of the required filesystems, the operation of computer system would still be usable, but some of the data may be missing. Further, insignificant differences are those differences found that have no effect on the operation of the computer system or applications. For instance, a process attached to a terminal is insignificant, since the process is being run by a user at the terminal and, thus, is insignificant to the operation of the system. Another example of an insignificant difference is a filesystem that is always 98% full or more because of consistent data on the filesystem. This is insignificant to the operation of the computer system given that the disk space usage never changes. Further yet, another example of an insignificant difference is where a default route is not defined on a computer system and a ping to the default route fails. Since the default route is not defined on the system, the failure of this default route is insignificant to the operation of the computer system.

As such, the configuration snapshot tool can check the operating system configuration of devices and programs (such as, operating system components, hardware components, disk storage components and network components) that are running on the system by running component scripts that are specific to the program or device that it is checking and it can be set up to automatically ignore devices or programs that are not relevant to the successful operation of a service running (for instance, a web server serving pages) on the machine or computer system. For instance, the configuration snapshot tool identifies changes to locations of hard disks and their corresponding changes to virtual paths as well as changes to locations of hard disks that do not have corresponding changes to virtual paths by identifying missing disk resources. Further, the configuration snapshot tool checks communication to default gateways and servers to identify any changes, checks system clock, checks error log for hardware and software errors, checks load balancing systems, and checks failover systems. For instance, if there are problems with changes to a hard disk or disks, the tool identifies if any corresponding virtual path or paths point to the new hard disk(s) as well as the hard disk(s) that the virtual paths point to and whether or not there is comparable memory size in the new hard disks. Furthermore, the configuration snapshot tool differentiates between dynamic routes (which do not cause corresponding losses in function) and persistent routes (which may cause corresponding losses in function). As such, the configuration snapshot tool can be used to identify any dynamic routes that may have changed from the first configuration snapshot to the second configuration snapshot, but which can be ignored, versus any persistent routes that should remain the same and, if changed, could significantly effect the performance of a system. The configuration snapshot tool can also be used to discover new components that have been added to the system and/or allows a user to add new components to be checked to the list of components defined in one or more configuration files. Further, the configuration snapshot tool can be easily modified to run on different operating systems and can be modified to add additional configuration checks by adding component name to the list of components to be checked and by creating new component scripts for the components being added. Similarly, the configuration snapshot tool can be modified to delete any configuration checks by deleting the components from the list defined in the configuration files for the system.

Reference is now made to FIGS. 1 through 11B, which illustrate a method of verifying configuration of a computer system using a configuration snapshot tool that is comprised of various modules, in accordance with an embodiment of the invention. Turning to FIG. 1, the method or process 100 of verifying configuration of a system starts at step 102 with the program initializing in step 104 by setting up default values for various variables. The configuration snapshot tool or program gets options or flags that are selected in step 106 and checks the validity of the options or flags in step 108. In an embodiment, the configuration snapshot tool is run on an AIX® platform (commercially available from International Business Machines (IBM) Corporation) or a Linux platform (different versions of Linux are distributed commercially by a number of companies), however, the configuration snapshot tool can be run on any Unix® platform by creating the appropriate component scripts. The configuration snapshot tool or program reads the configuration files in step 110, which contains a list of components and sub-components whose configurations should be checked and reads the ignore file in step 112, which defines configuration data that should be ignored for the system. The configuration snapshot tool or program checks whether the "-w" option or flag is entered or selected in step 114. If the "-w" option or flag is selected ("yes" branch), then in step 122, the checkout utility executes the procedure, script or module that writes or creates a new status file from scratch, which is described in detail further herein below with respect to FIG. 2. If the "-w" option or flag is not selected ("no" branch) or after the Write New File module 122 has been completed, the configuration snapshot tool or program checks if the "-new" option or flag is entered or selected in step 116. If the "-new" option or flag is selected ("yes" branch), the checkout utility executes the Check Components procedure, script or module 124 that checks configuration information pertaining to any new components added and/or any changes in component configurations since the last time the configuration snapshot tool was run on the computer system. The configuration snapshot tool generates a list of new or changed components and writes the new or changed components found to a "New" file or "new" data file. The Check Components module 124 is described further herein below with respect to FIG. 3. Further, if the "-new" option or flag is not entered in step 116 ("no" branch) or after the Check Components module has completed, the configuration snapshot tool or program checks whether the "-comp" option or flag is entered in step 118. If the "-comp" option or flag is entered ("yes" branch), then in step 126, the configuration snapshot tool or program prints or displays a list of all the components defined in the configuration file and ends at step 127. However, if the "-comp" option or flag is not entered ("no" branch), then in step 120, the configuration snapshot tool or program checks whether the "-delete" option or flag has been entered, which causes records to be deleted from the status file. If the "-delete" option or flag is selected ("yes" branch), the Delete Records procedure, script or module is started at step 128, which is described in detail herein below with respect to FIG. 4. However, if the "-delete" option or flag is not entered and after the Delete Records module has been completed, the configuration snapshot tool or program checks whether the "-l" option or flag has been entered in step 130. If the "-l" option or flag is entered ("yes" branch), then the configuration snapshot tool or program starts the Read Status File procedure, script or module in step 142 (described further herein below with respect to FIG. 5) and lists the existing configuration data for the components that is recorded or written in the status file along with line numbers, and upon completion, the module ends at step 150. On the other hand, if the "-l" option or flag is not selected ("no" branch), the configuration snapshot tool or program checks in step 132 whether the "-ln" option or flag is entered. If the "-ln" option or flag is entered ("yes" branch), then the Read New File procedure, script or routine (described herein below with respect to FIG. 15) is started in step 144, which lists the contents of the "New" data file, that is, lists the new or changed components along with the line numbers, and upon completion, the module ends at step 150. If the "-ln" option or flag is not selected or entered in step 132, then in step 134, the configuration snapshot tool or program checks whether the "-update" option or flag is entered. If the "-update" option or flag is entered ("yes" branch), then the Update Components procedure, script or module is started in step 146 (described in detail herein below with respect to FIG. 6), and upon completion, the module ends at step 150. However, if the "-update" option or flag is not entered ("no" branch), then in step 136, the configuration snapshot tool or program checks whether the "-newadd" option or flag is entered and, if so ("yes" branch), the Add New Records procedure, script or module is started in step 148, as described further with respect to FIG. 7. If the "-newadd" option or flag is not selected ("no" branch), then the configuration snapshot tool or program runs in step 140 the Check Components procedure, script or module 140 for processing or obtaining current configuration data for the components defined or set forth in the configuration file (as described further herein below with respect to FIG. 8) and upon completion, the module ends at step 150.

Figure 2:
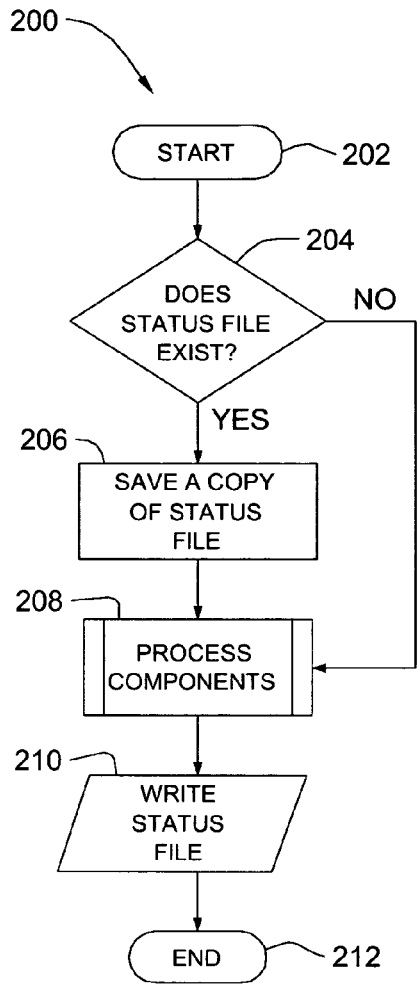
FIG. 2 is a flowchart depicting a module or routine for creating a new status file or snapshot of a computer system, in accordance with an embodiment of the present invention.

Turning to FIG. 2, the flowchart outlines the procedure, script or module 200 (called from step 122 of FIG. 1), which writes or creates a new status file (from scratch) that contains new configuration information or data for the various components of a system, as defined in the configuration file. The module starts at step 202, and in step 204, the configuration snapshot tool or programmable media checks whether or not the status file exists. If the status file exists ("yes" branch) in step 204, then a copy of the status file is saved in step 206. However, if the status file does not exist or after a copy of the status file is saved in step 206, then the Process Components procedure, script or module is run in step 208 for processing or obtaining new configuration data for the components set forth or defined in the configuration file, as described further herein below with respect to FIG. 8. After the Process Components procedure has been completed in step 208, the program writes in step 210 the configuration data or information for the components whose configurations have been checked or obtained to the status file, which ends the module at step 212.

Figure 3:
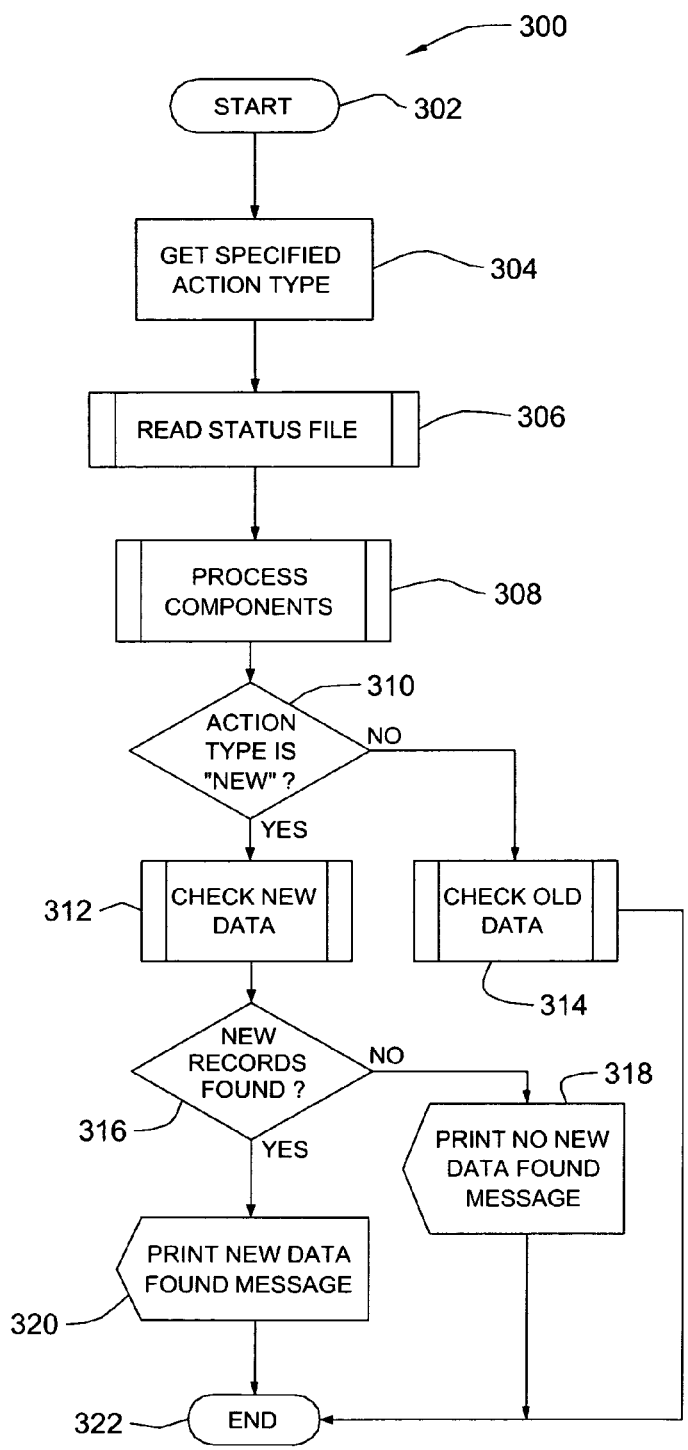
FIG. 3 is a flowchart depicting a module or routine for checking configuration of components of a computer system, in accordance with an embodiment of the present invention.

Turning to FIG. 3, the flowchart outlines the Check Components procedure, script or module 300 (called from steps 124 and 140 of FIG. 1), which checks existing components as well as any new components that are added to the system using the Process Components procedure or module, as will be described herein below with respect to FIG. 8. The module starts at step 302 and in step 304, the configuration snapshot tool or program gets the specified action type, for instance, the action could be for checking configuration of new or changed components ("yes" branch of step 310) or the action could be for checking configuration of existing or current components ("no" branch of step 310). Next, in step 306, the configuration snapshot tool or program runs the Read Status File procedure, script or module (as will be described herein below with respect to FIG. 5) and lists or gets the existing configuration data (along with line numbers) for the components recorded or written in the status file. Further, the Process Components module, script or procedure is run in step 308 to process each component and get new configuration data for the system. The configuration snapshot tool or program determines in step 310 whether or not the action type is "new" and, if so, in step 312, the Check New Data module is run to compare the new configuration data obtained in step 308 with the old configuration data obtained in step 306, as described in detail herein below with respect to FIGS. 11A-11B. Further, in step 316, the module 300 checks whether any new configuration data records have been found. If new configuration data records are found ("yes" branch), then a "new configuration data found" or similar message is printed or displayed in step 320, ending the module 300 at step 322. On the other hand, if no new records are found ("no" branch) in step 316, then a "no new data found" or similar message is printed or displayed in step 318, ending the module 300 at step 322. Moreover, if the configuration snapshot tool or program determines in step 310 that the action type is not "new", then in step 314 the Check Old Data module is run to compare the old configuration data obtained in step 306 with the new configuration data obtained in step 308 (as described in detail herein below with respect to FIG. 10) and upon completion the module 300 ends at step 322.

Figure 4:
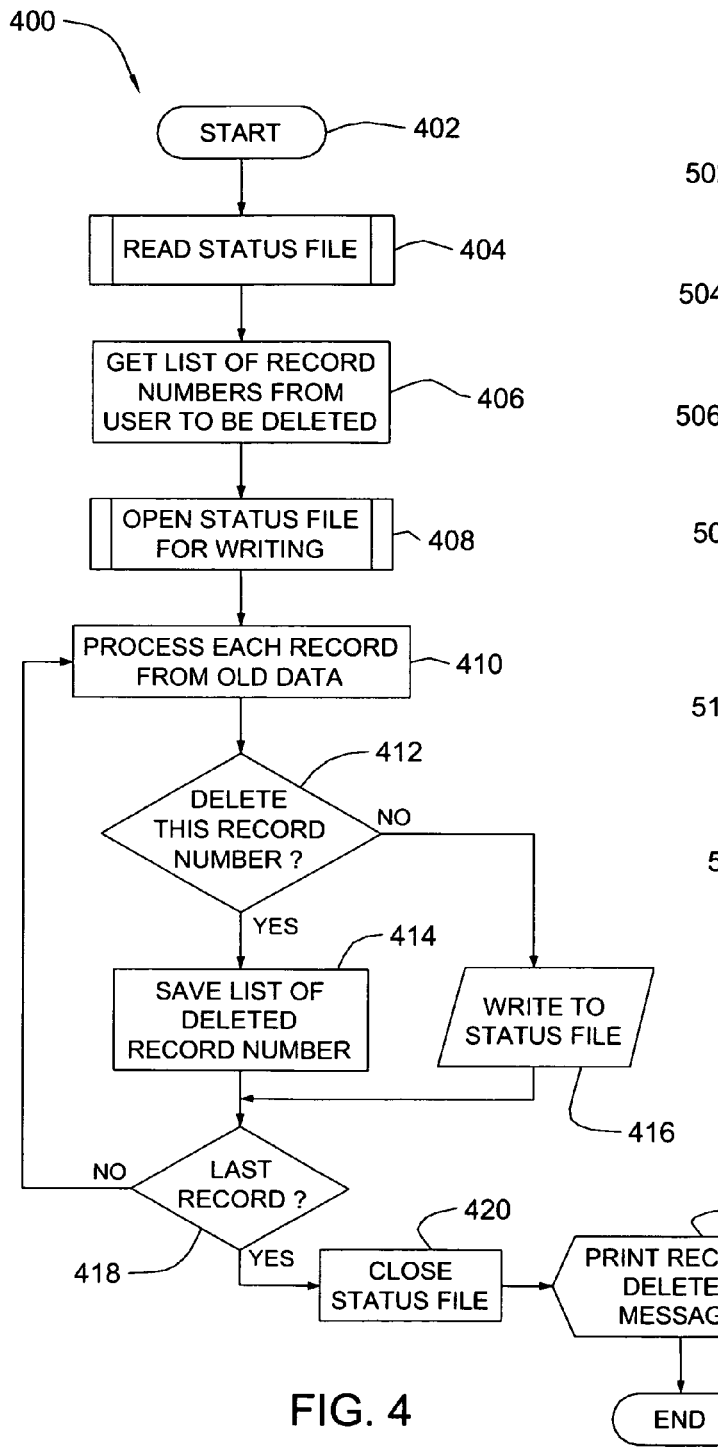
FIG. 4 is a flowchart depicting a module or routine for deleting existing records that contain configuration data for non-relevant components of a computer system, in accordance with an embodiment of the present invention.

Turning to FIG. 4, the flowchart outlines the Delete Records procedure, script or module 400 (called from step 128 of FIG. 1), which deletes records pertaining to components whose configuration data is not relevant to the functional operation of the system. The module starts at step 402 and in step 404 the Read Status File module or routine is run to obtain existing configuration data, as will be described herein below with respect to FIG. 5. The module 400 further gets in step 406 a list of record numbers from a user as to the records to be deleted. In step 408, the status file is opened for writing and each record of the existing configuration data is processed in step 410. Further, in step 412, for each record and corresponding record number processed, the module determines whether or not the record with the corresponding record number should be deleted. If the record is to be deleted then the deleted record number is added and saved to a list of deleted record numbers in step 414. If the record is not to be deleted then, the record is written to or saved in the status file in step 416. After either saving the deleted record number in the list of deleted record numbers in step 414 or printing or saving the undeleted record number in the status file in step 416, the module checks whether the record processed is the last record in step 418 and, if it is not the last record, then steps 410 through 418 are repeated until the last record is obtained using the Read Status File module. If it is the last record in step 418, then the status file is closed in step 420 and a record deleted message is printed or displayed in step 422, ending the module at step 424.

Figure 5:
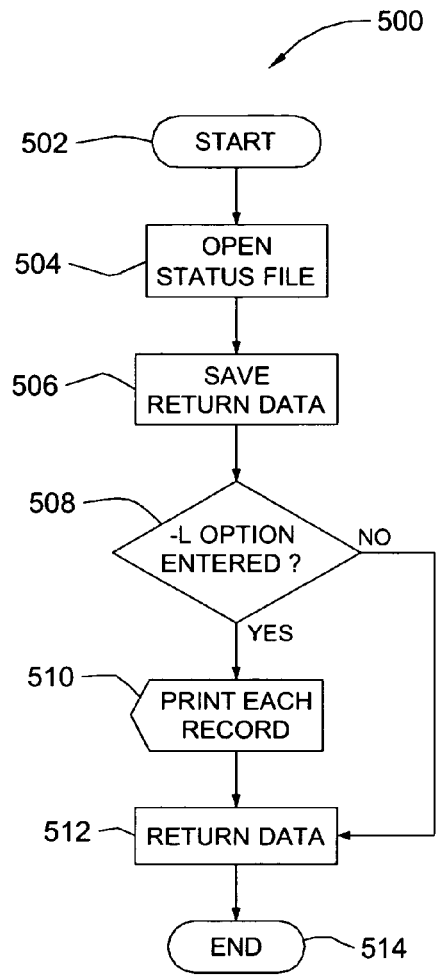
FIG. 5 is a flowchart depicting a module or routine for reading a status file that contains configuration data for all relevant components of a computer system, in accordance with an embodiment of the present invention.

Turning to FIG. 5, the flowchart outlines the Read Status File procedure, script or module 500 (called from step 142 of FIG. 1), which reads the existing configuration data for the components as previously recorded in the existing or old status file. The module starts at step 502 and in step 504 the status file is opened and reads the return data, that is, data to be returned to the configuration snapshot tool. Next, in step 506, the return data that is read from the status file is saved. In step 508, a determination is made whether or not "-l" option or flag was entered and, if so, the module 500 prints or displays each record in step 510 and, further, returns the data to the configuration snapshot tool in step 512. However, if, in step 508, if the "-l" option or flag is not entered then, the data is returned to the configuration snapshot tool or program in step 512 and the module ends in step 514.

Figure 6:
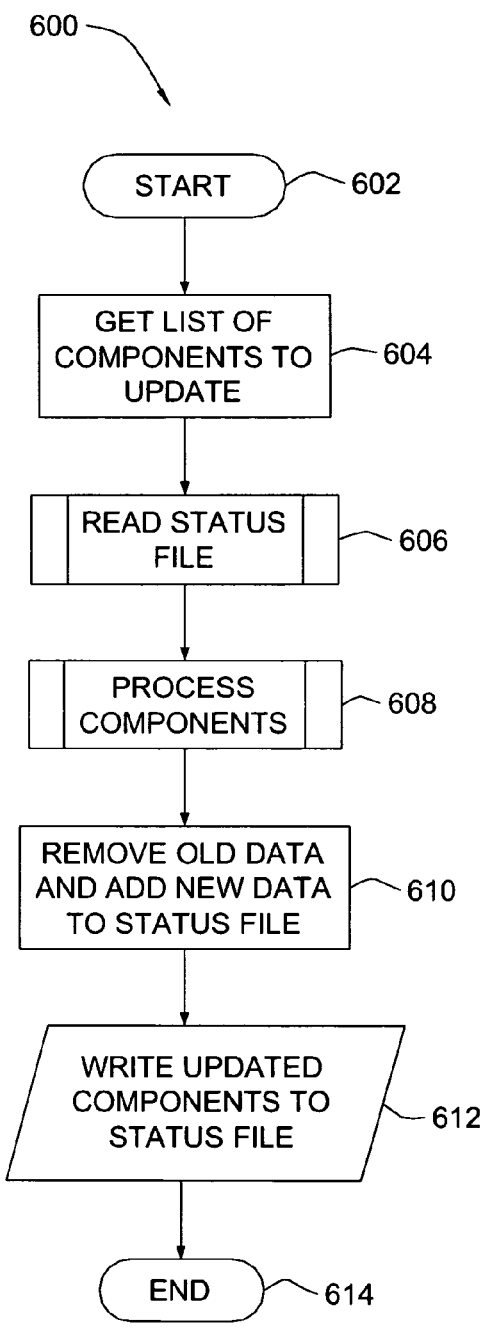
FIG. 6 is a flowchart depicting a module or routine for updating a list of relevant components of a computer system whose configuration is to be checked, in accordance with an embodiment of the present invention.

Turning to FIG. 6, the flowchart outlines the Update Components procedure, script or module 600 (called from step 146 of FIG. 1), which removes components whose configurations are not to be checked and adds components whose configurations are to be checked for generating a configuration snapshot for a system. The module starts at step 602 and in step 604, the module gets a list of components of a system to be updated. The Read Status File module is run to obtain existing configuration data in step 606. Further, in step 608, the Process Components module is run to obtain new configuration data for the list of components that are to be updated. The Update Components module in step 610 removes or deletes existing or old configuration data from the status file and adds new configuration data to the status file for the list of components being updated, essentially, updating the data so that the data in the status file corresponds to the updated list of components. In step 612, the updated data corresponding to the list of the updated components is written to the status file, ending the module 600 at step 614.

Figure 7:
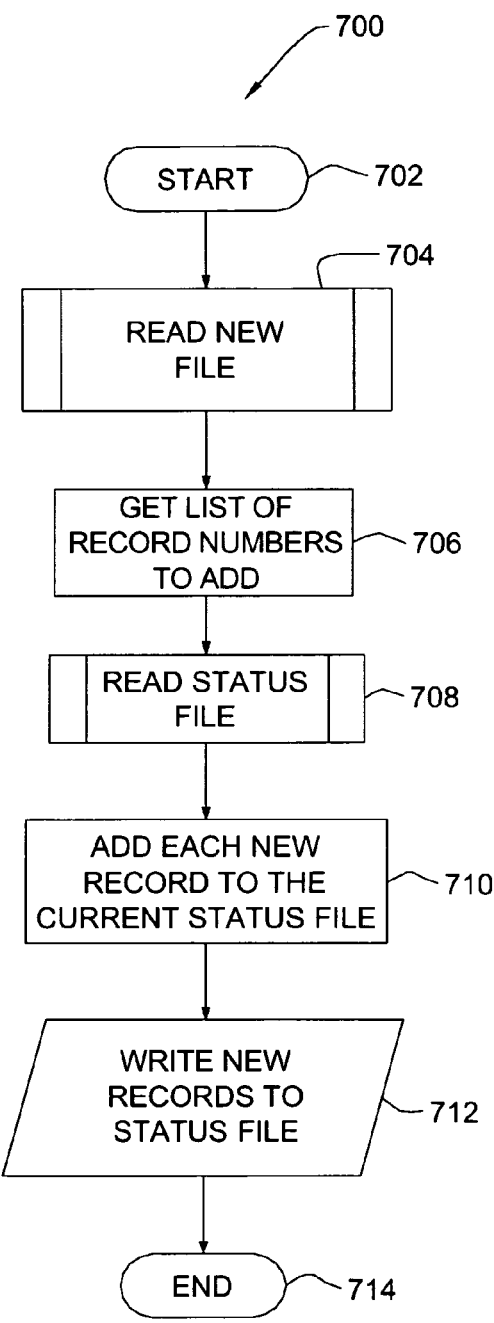
FIG. 7 is a flowchart depicting a module or routine for adding new records containing configuration data pertaining to relevant components of a computer system, in accordance with an embodiment of the present invention.

Turning to FIG. 7, the flowchart outlines the Add New Records procedure, script or module 700 (called from step 148 of FIG. 1), which adds to the existing or old status file new records that correspond to new components or components whose configuration have changed. The module starts at step 702 and in step 704, the module 700 reads configuration data from the "New" file, which contains new configuration data that does not exist in the current status file, the Read New File procedure is described further herein below with respect to FIG. 15. Basically, an administrator or a user can periodically determine if any of the data in the "new" file is considered important and should be included in the status file. If so, the "-newadd" flag is used to add the data to the status file, as shown in steps 136 and 148 of FIG. 1. In step 706, the module 700 gets a list of record numbers to add. The module further runs or calls the Read Status File module in step 708 and obtains old or existing configuration data in the existing or old status file. In step 710, the module 700 adds each new record in the list of record numbers to be added that was obtained in step 706 to the existing or old status file. Further, in step 712, the new records are written to the existing or old status file to update the status file, ending the module at step 714.

Figure 8:
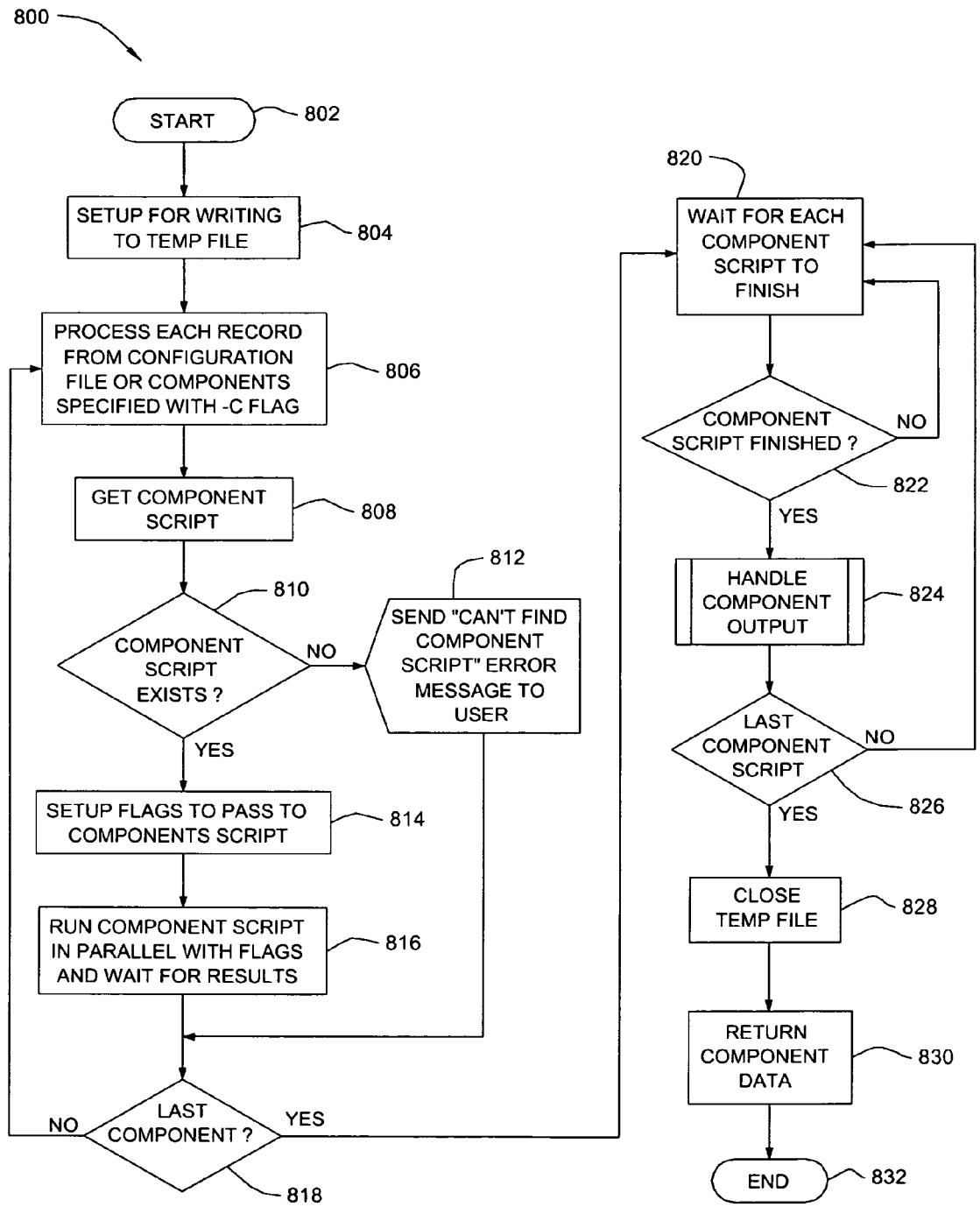
FIG. 8 is a flowchart depicting a module or routine for processing a list of relevant components of a computer system whose configuration is to be checked, in accordance with an embodiment of the present invention.

Turning to FIG. 8, the flowchart outlines the Process Components procedure, script or module 800 (called from step 308 of FIG. 3), which processes the configuration data for the components defined in the configuration file. The module starts at step 802 and in step 804, the module 800 begins setup for writing to a temporary (temp) file. Since the component scripts are run in parallel, the output from each component that is returned to the configuration snapshot tool may be in random order, thus, the temp file is created and used to store the output from each component script so that it can be sorted, keeping output for a component that is received in a random fashion in a group together. Next, in step 806, each record from the configuration file or the components specified with a "-C" flag are processed or checked. In step 808, the Process Components procedure, script or module 800 gets for each component specified in step 806 the corresponding component script and checks in step 810 whether or not the component script corresponding to the component whose configuration is to be checked exists. If the component script does not exist ("no" branch), then in step 812 a "can't find component script" error or similar message is sent to a user and the module continues with step 818. However, if the component script exists ("yes" branch) in step 810, then the module starts in step 814 to setup flags to pass to the corresponding component script. In step 816 the component script is run in parallel with the flags and the results are received by the Process Components module 800. After the component script is run in step 816 or after sending an error message in step 812, the module 800 checks whether the component checked is the last component in step 818 and, if it is not the last component, then steps 806 through 818 (as described herein above) are repeated until the last component is processed. If the last component is processed in step 818, then the module script 800 waits in step 820 for each component script being run in parallel in step 816 to finish and determines whether or not the component script has finished running in step 822. If the component script is not finished running, the module 800 waits in step 820 until the component script is finished running. When the component script is finished running in step 822, the Handle Component Output module is initiated in step 824, which handles or processes the output from each of the component scripts run to check configuration of each corresponding component in the system, as described herein below with respect to FIG. 9. The Process Components module or script determines in step 826 whether the last component script has been handled by the Handle Component Output module in step 824 and, if not, the module 800 repeats steps 820 through 824 until the last component script has been processed in step 826. The temp file is closed in step 828 and the component data is returned in step 830 to the module or routine that called it (for instance, the Write New File module that calls the Process Components routine in step 208 of FIG. 2, the Check Components module that calls the Process Components routine in step 308 of FIG. 3 and/or the Update Components module that calls the Process Components routine in step 608 of FIG. 6), ending the module at step 832.

Figure 9:
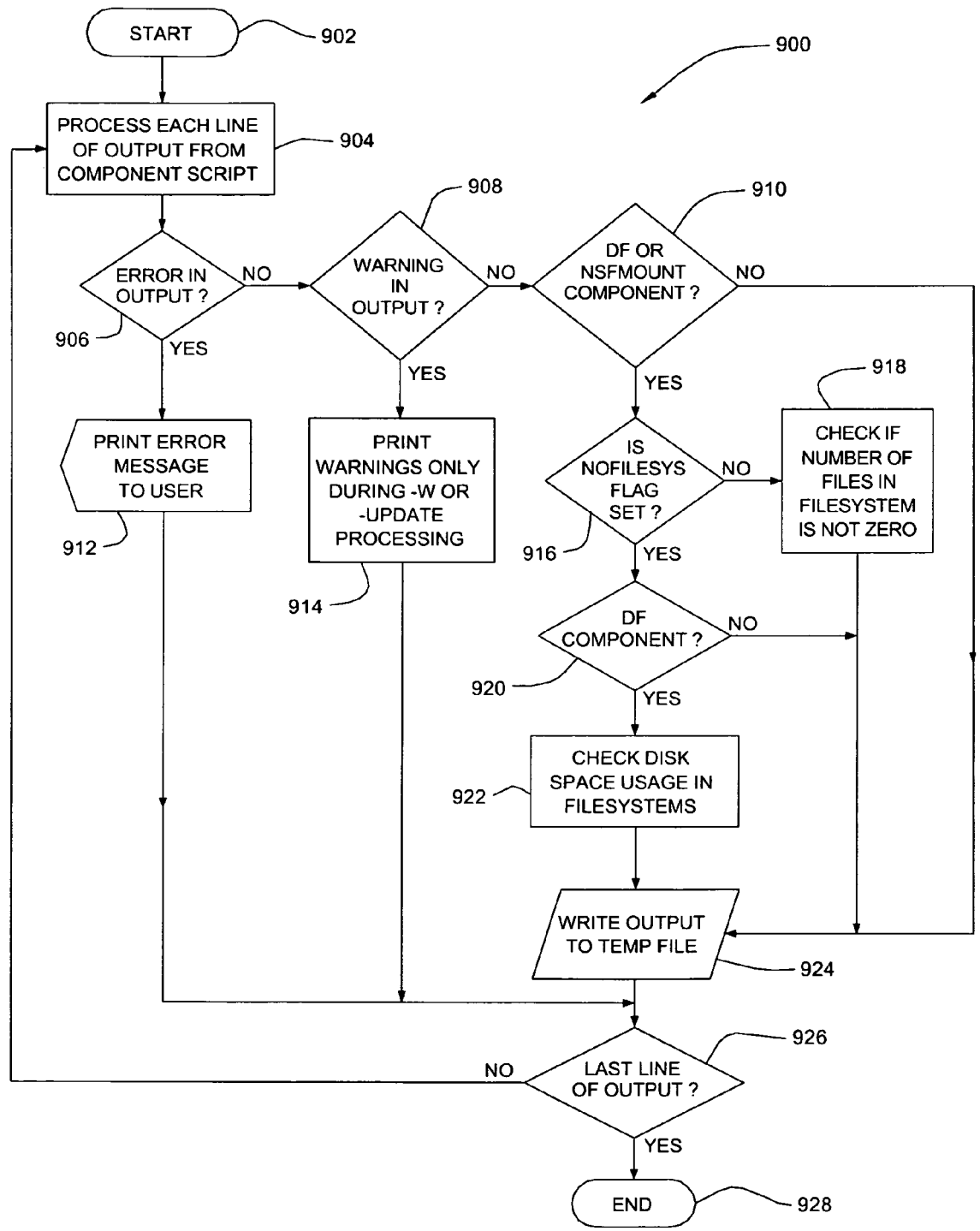
FIG. 9 is a flowchart depicting a module or routine for handling component output from respective component scripts corresponding to respective components of a computer system whose configuration is checked, in accordance with an embodiment of the present invention.

Turning to FIG. 9, the flowchart outlines the Handle Component Output procedure, script or module 900 (called from step 824 of FIG. 8), which handles or processes the output from each of the component scripts run to check configuration of each corresponding component in the system. The module starts at step 902 and in step 904, the Handle Component Output module or script 900 processes each line of output from a component script. In step 906, the Handle Component Output module checks whether or not there are any errors in the output. The component script prints in step 912 an error message if it finds a problem that may be critical to the operation of the system. If there are no errors in the output in step 912, it checks whether or not there are any warnings in the output in step 908. In particular, if the component scripts find a problem that is not critical, but significant, then it will print a warning message. If in step 908 there are warnings in the output ("yes" branch), the module 900 prints a warning message at the time the status file is written ("-w" processing) or updated ("-update" processing) in step 914, so that a user or administrator is made aware of the warnings at the time the status file is either written or updated, but the warnings will not be printed after the configuration snapshot tool has completed checking the system. Moreover if there are no warnings in the output, the Handle Component Output module 900 checks if the component script is for a DF (Display Filesystem) or NFSMOUNT (Network File System mount) component in step 910 and if "yes", it checks whether or not the "-nofilesys" flag or option is set or entered in step 916. If the "-nofilesys" flag is not set ("no" branch), then the module 900 checks in step 918 if the number of files in the network file system or local file system (DF) is not zero. If the "-nofilesys" flag is set ("yes" branch), then the Handle Component Output module skips checking if there are any files in step 918 and determines in step 920 if the component script is for a DF component and, if so ("yes" branch), the disk space usage of file systems in the network file system is checked in step 922. After step 918 and step 922, the Handle Component Output module 900 writes each line of the output that has been processed to a temporary (temp) file in step 924. Moreover, going back to step 906, if there are any critical errors discovered in the output, the error messages are printed or displayed for the user or administrator in step 912. After step 912, 914 and 924, a determination is made in step 926 as to whether or not the last line of output from a component script has been processed, if "yes", then the module ends at step 928. However, if the last line of output from a component script has not been processed in step 926, then the steps 904 through 926 are repeated until the last line of output from a component script has been processed.

Figure 10:
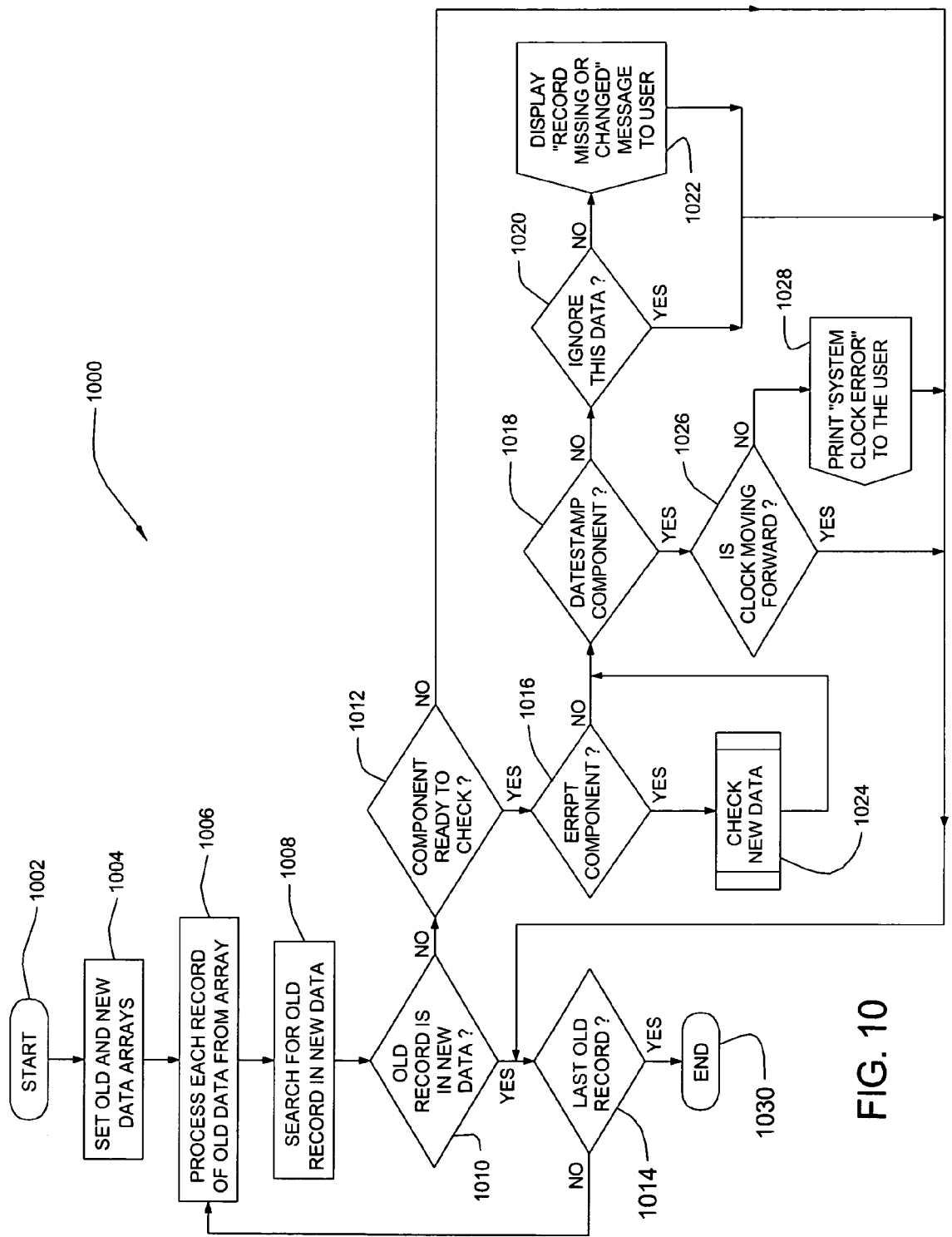
FIG. 10 is a flowchart depicting a module or routine for comparing old or existing configuration data to new or current configuration data for components of a computer system, in accordance with an embodiment of the present invention.
Figure 11A:
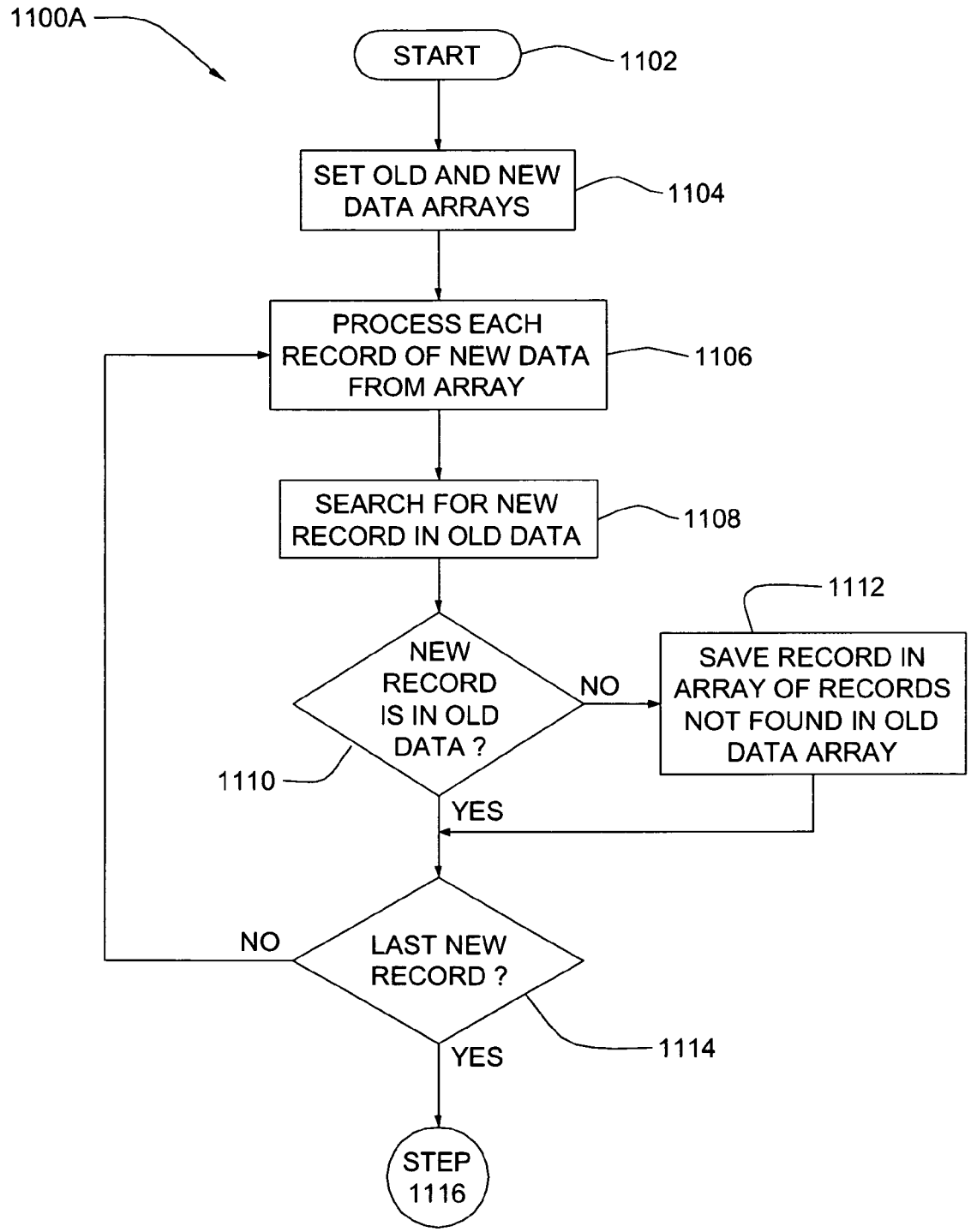
FIGS. 11A and 11B are flowcharts that depict a module or routine for comparing new or current configuration data to old or existing configuration data for components of a computer system, in accordance with an embodiment of the present invention.
Figure 11B:
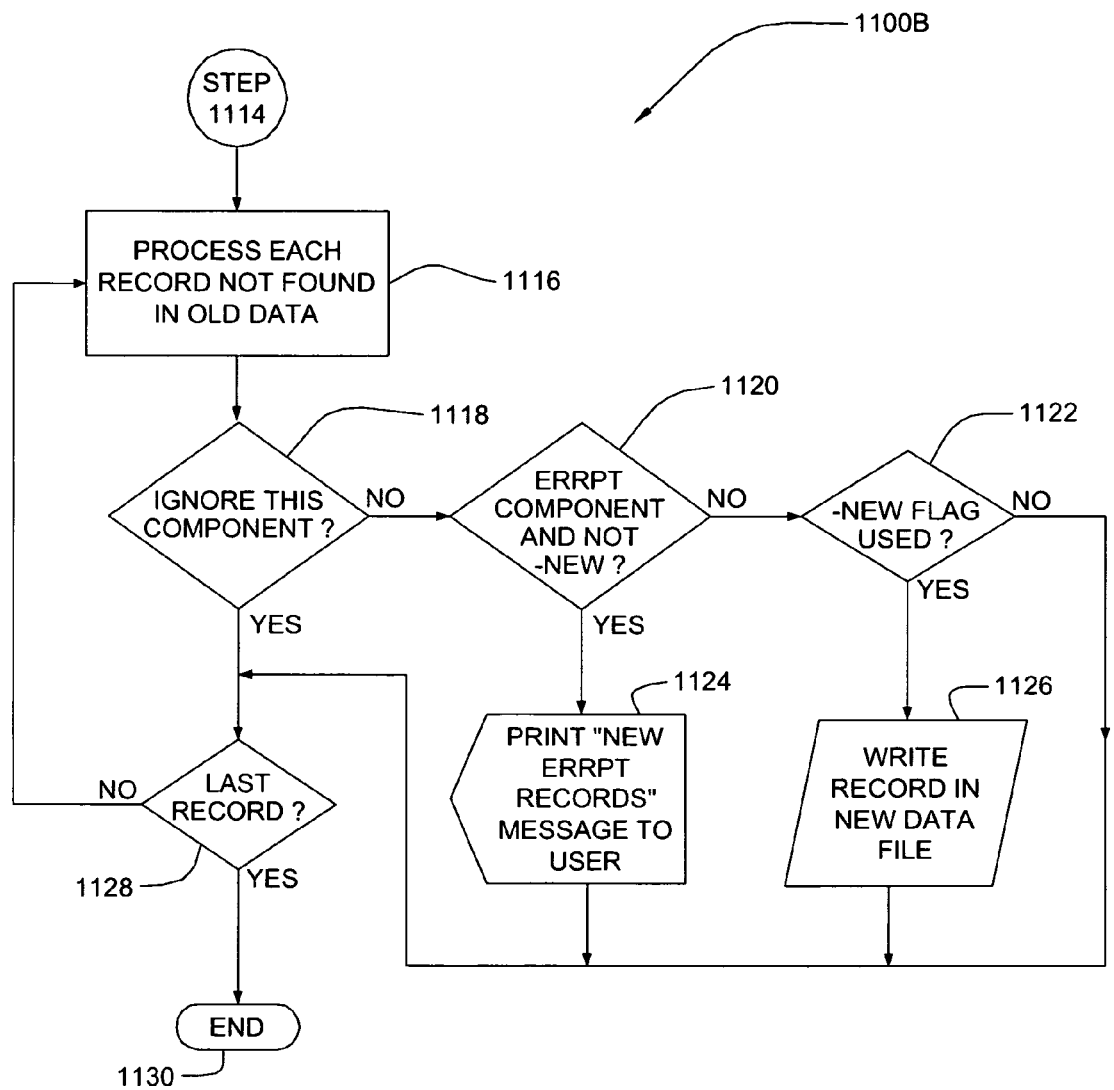

Turning to FIG. 10, the flowchart outlines the Check Old Data procedure, script or module 1000 (called from step 314 of FIG. 3), which compares old or existing configuration data with current or new configuration data. The module starts at step 1002 and in step 1004, the old and new data arrays are set, whereby the data from the old status file and the new data returned from the Process Components routine is read into memory. In step 1006, each record of old data from the old array are processed and in step 1008 the module 1000 searches for old record in the new data, that is, searches for existing configuration data in the current configuration data (for instance, using the grep command available in the Unix® operating system). A determination is made in step 1010 whether or not an old record is in the new configuration data in step 1010 and, if no old record is found in the new data, then a determination is made in step 1012 as to whether or not the component is ready to be checked. In an embodiment, each of the components listed in the configuration file are coded with a "Y" (for "yes", okay to check that component) or "N" (for "no", not okay to check that component). If the component is okay to be checked ("yes" branch), then in step 1016, a determination is made as to whether or not the component is an error reporting (ERRPT) component. If "yes", then the Check New Data module is run in step 1024 (described further with respect to FIGS. 11A and 11B herein below) for checking only new configuration data since the last run of the configuration snapshot tool or program. If it is determined that the component is not an error reporting component or after new data has been checked in step 1024, a determination is made in step 1018 as to whether or not the component is a system clock component. If it is a system clock component, then a determination is made as to whether or not the clock is moving forward in step 1026. If the system clock is not moving forward, a system clock error message is printed, displayed or sent to the user in step 1028. After checking whether the system clock is moving forward in step 1026 or after sending the user an error message with respect to the system clock in step 1028, the module 1000 continues with step 1014. In step 1018, if it is determined that it is not a system clock component, then a determination is made as to whether or not to ignore in step 1020 the data for the component being checked. For instance, in the ignore file, one can define data that is to be ignored. For example, a filesystem that is not mounted and, hence, not critical to the operation of the system can be ignored. If data is to be ignored in step 1020, the module continues with step 1014, however, if the data is not be to ignored, then a record missing or record changed message is sent or displayed or printed to the user in step 1022, bringing the module to step 1014. Going back to step 1014, if it is determined to be the last record, then the module ends at step 1030. However, if it is not the last old record, then steps 1006 through step 1014 are repeated until the last old record has been processed in step 1014.

Turning to FIGS. 1A and 1B, the flowcharts together outline the Check New Data procedure, script or module 1100A and 1100B (called from step 312 of FIG. 3), which compare new or current configuration data with old or existing configuration data. Referring to FIG. 1100A, the module starts at step 1102 and in step 1104, the old and new data arrays are set. In step 1106, each record of old data from the old array are processed in step 1006. Further in step 1108, a search is made for a new record in the old configuration data. Next, a determination is made in step 1110 whether or not the record being processed is a new record in the old configuration data and, if it is not a new record ("no" branch), then in step 1112, the record is saved in an array of records not found within the old data array. However, in step 1110, if the record being processed is a new record that is found in the old or existing configuration data, then a determination is made in step 1114 as to whether or not the record is the last new record. If it is not the last new record ("no" branch), then steps 1106 through 1112 are repeated until the last new record has been processed in step 1114. However, if in step 1114, it is determined that the record is the last new record, then the module continues with step 116 as shown by reference numeral 1100B in FIG. 11B. In step 1116, each record that is not found in the old or existing configuration data is processed. In step 1118, a determination is made as to whether or not to ignore the data whose record is being processed. If the data is not to be ignored, then in step 1120, a determination is made as to whether or not the component is an error reporting component and not "-new", that is, the "-new" flag was not entered. If it is an error reporting component and not "-new" ("yes" branch), that is, the "-new" flag was not entered, then a new message for an error reporting record is displayed, sent or printed to the user in step 1124, and the module continues with step 1128. However, if in step 1120, it is determined that it is not an error reporting component and not "-new", then a determination is made as to whether the "-new" flag was used or entered in step 1122. If a "-new" flag was entered ("yes" branch), then the record is written to a new data file in step 1128. However, if the component is to be ignored in step 1118 or if a "-new" flag was not entered in step 1122 or after the record is written to a new data file in step 1126, the module continues with step 1128. In step 1128, a determination is made as to whether or not the record being processed is the last record. If it is the last record ("yes" branch), then the module ends at step 1130. However, if it is not the last record ("no" branch), then steps 1116 through 1128 are repeated until the last record has been processed in step 1128.

Figure 15:
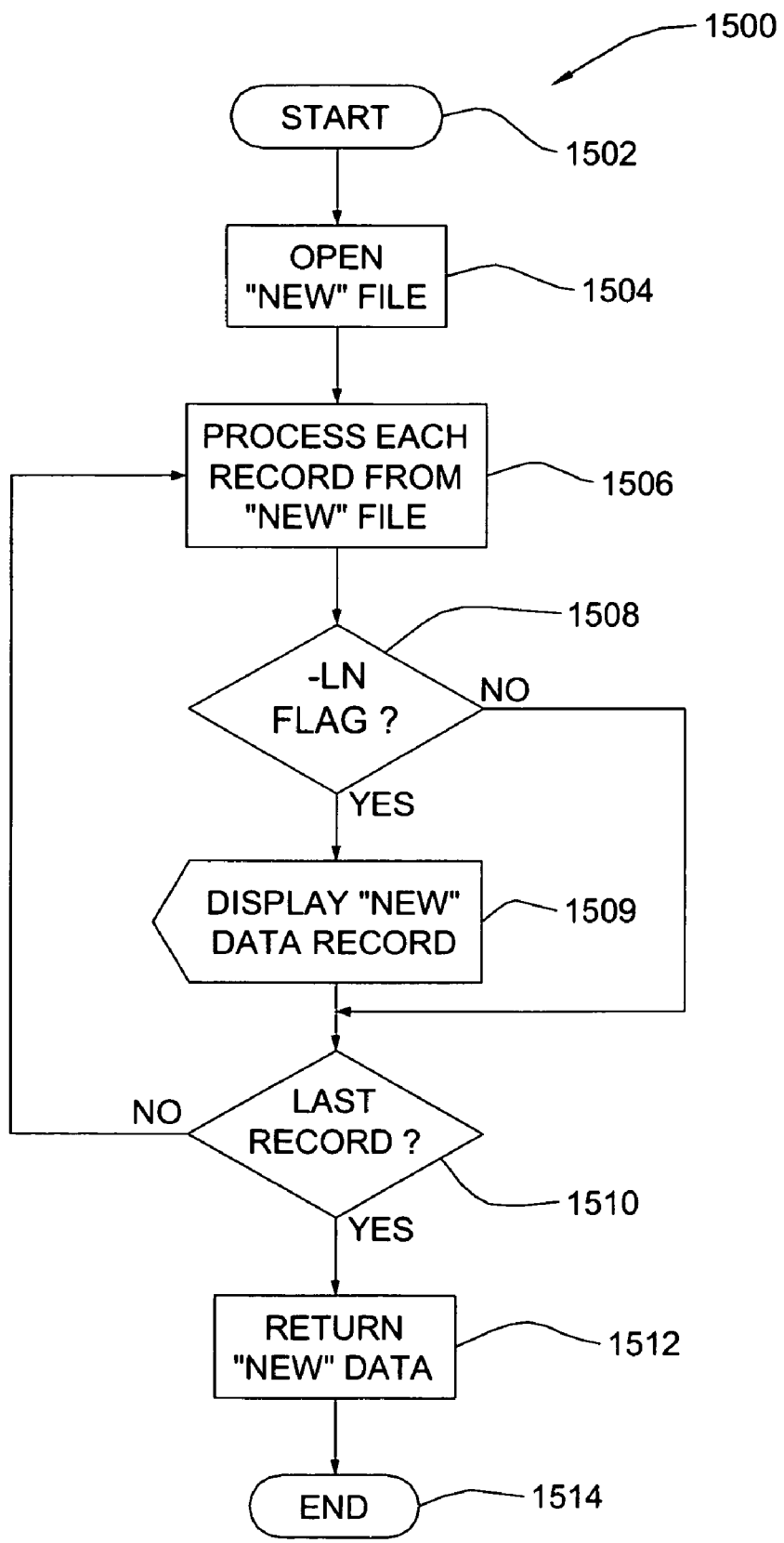
FIG. 15 is a flowchart depicting a module or routine for reading a new file that contains new configuration data for all relevant components of a computer system, in accordance with an embodiment of the present invention.

Turning to FIG. 15, the flowchart outlines the Read New File procedure, script or module 1500 (called from step 704 of FIG. 7), which reads the "New" file that contains new configuration data created using the "-new" option or flag. The module starts at step 1502 and in step 1504 the "New" file is opened in order to read any "new" data that is not in the existing status file. Next, in step 1506, each record in the "New" file is processed. In step 1508, a determination is made whether or not "-ln" option or flag was entered and, if so ("yes" branch), the module 1500 prints or displays each "new" data record in step 1510 and, further, returns the data to the configuration snapshot tool in step 1512. However, if, in step 1508, if the "-ln" option or flag is not entered ("no" branch) or after displaying the "new" data record in step 1509, then a determination is made in step 1510 as to whether or not it is the last record. If it is the last record ("yes" branch), then the "new" data is returned to the configuration snapshot tool or program in step 1512 and the module ends in step 1514. However, if it is not the last record ("no" branch), then steps 1506 through 1510 are repeated until the last record is processed.

Figure 12:
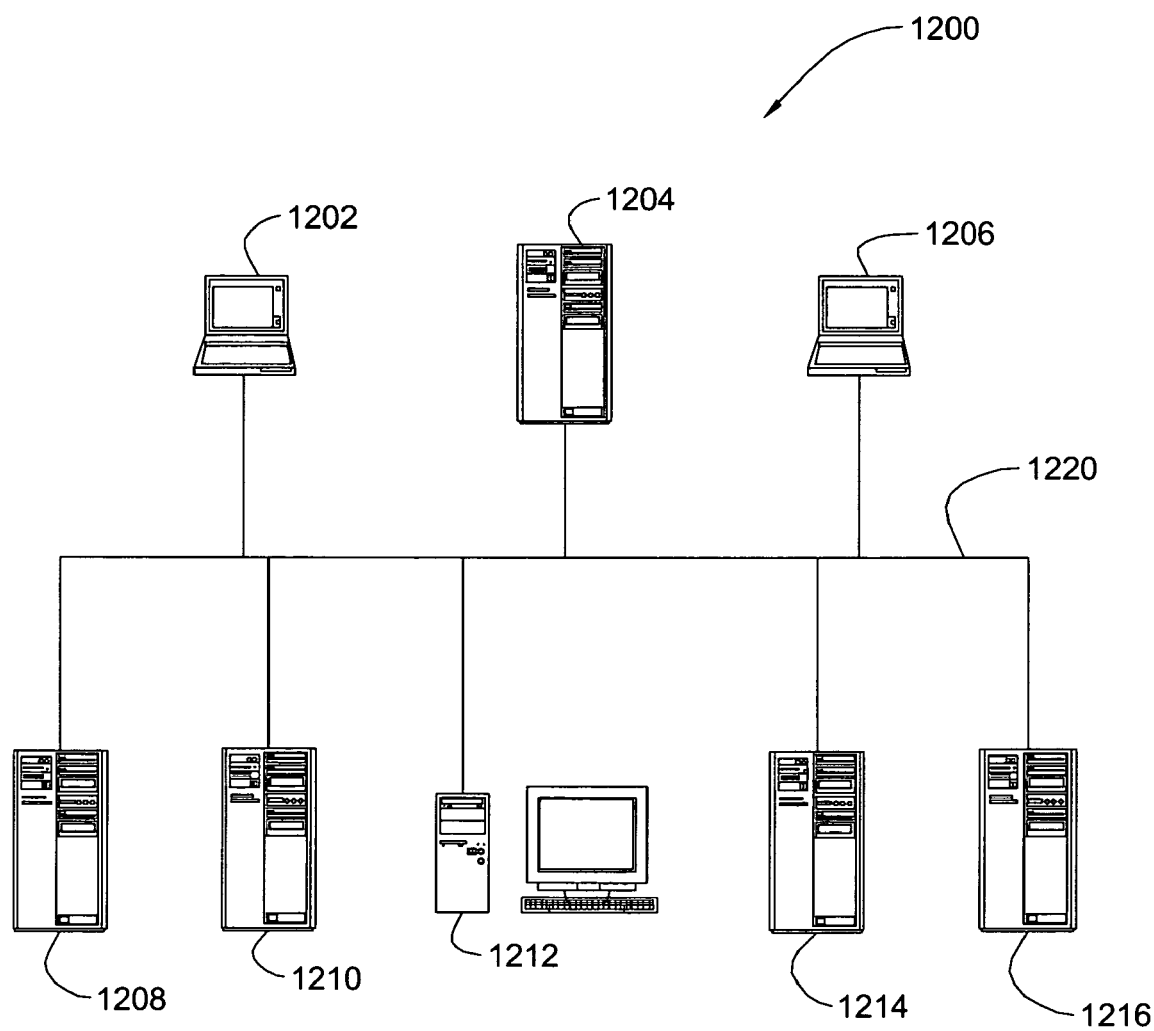
FIG. 12 is a schematic block diagram illustrating a system for checking configuration of a computer system, in accordance with an embodiment of the present invention
Figure 13:
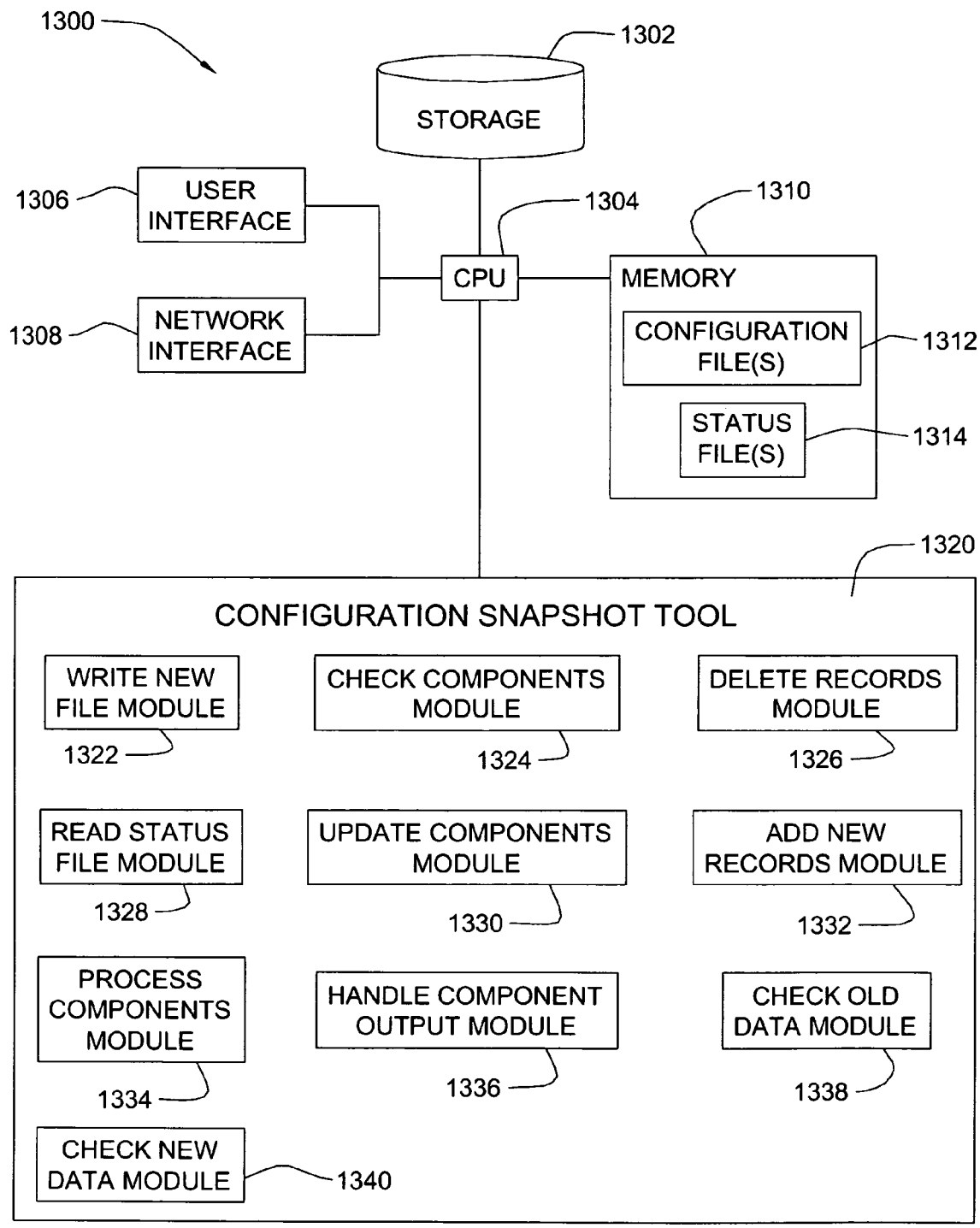
FIG. 13 is a schematic block system diagram illustrating a server for verifying configuration of a system, in accordance with an embodiment of the present invention.
Figure 14:
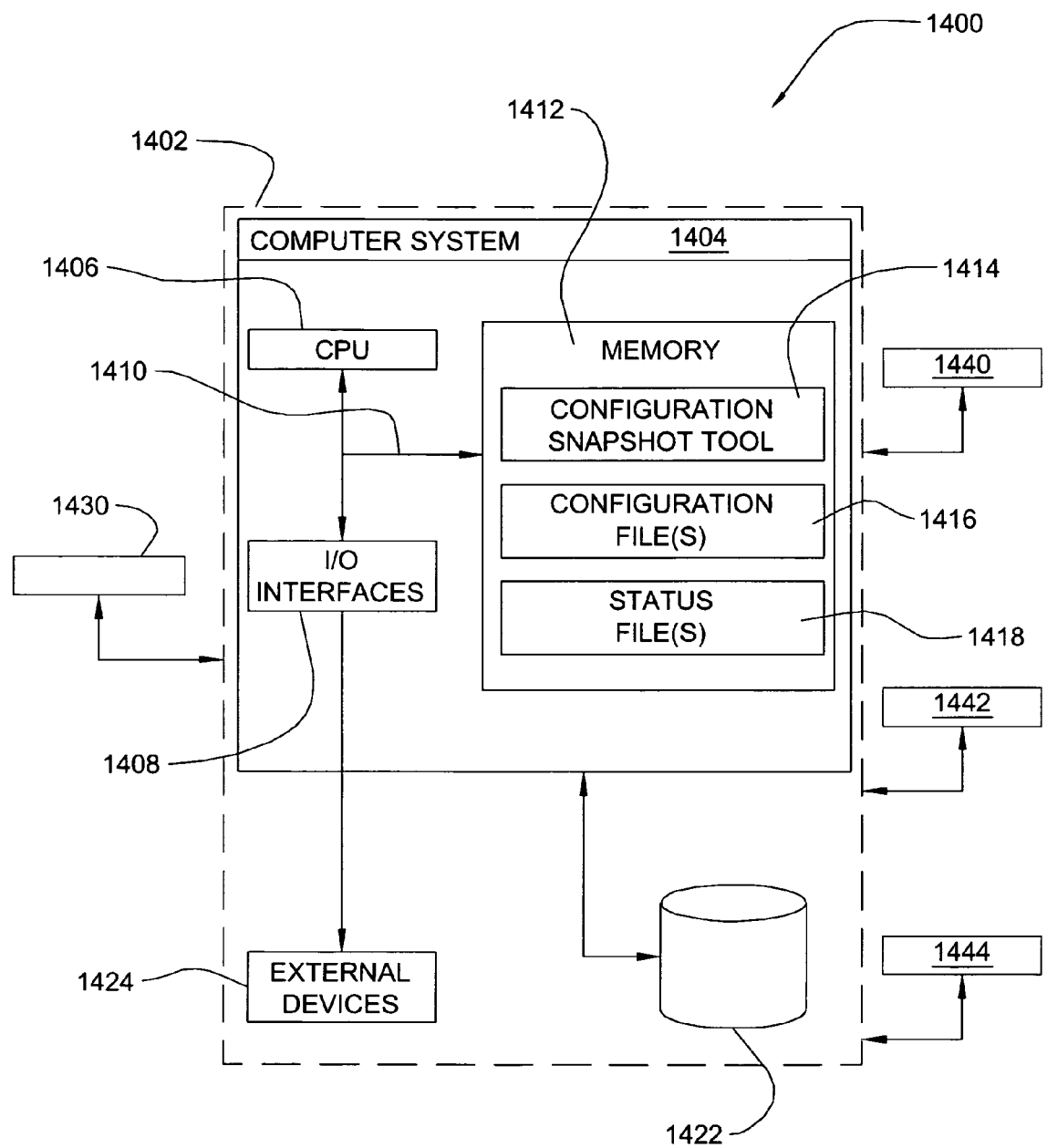
FIG. 14 is a schematic block system diagram illustrating a computer system having a computer program product for verifying configuration of a computer system, in accordance with an embodiment of the present invention.

In another embodiment, the invention provides a system for checking configuration of a computer system or server on a computer network. Reference is now made to FIGS. 12-14, which illustrate different embodiments of a system for checking configuration of a computer system or server on a computer network, in accordance with the invention. Turning to FIG. 12, reference number 1200 shows an embodiment of a computer system for checking configuration of a computer or server on a computer network. As shown in one embodiment in FIG. 12, the system 1200 comprises a network communications channel 1220, where a plurality of clients and servers are connected to the network communications channel 1220, for instance, the Internet, which serves as a communications channel for the various components of the system. Further, the system 1200 shown in FIG. 12 is similar to a local area network (LAN) and includes several clients and several servers, all of these clients and servers being connected via the communications channel 1220. The communications channel 1220 may be, in one embodiment, an Ethernet communications channel, a wireless communications channel, or another equivalent communications channel. Although the depicted networked computing infrastructure 1200 is shown to include three clients, 1202, 1206 and 1212, and five servers, 1204, 1208, 1210, 1214 and 1216, the networked infrastructure 1200 may comprise a combination of various network configurations having fewer or more clients and servers, as well as alternate client-server configurations. Preferably, the clients systems 1202, 1206 and 1212 are configured to access data or information from the servers 1204, 1208, 1210, 1214 and 1216. Further, each of the servers 1204, 1208, 1210, 1214 and 1216 may be configured to serve one or more specific functions, such as, web servers, administrative servers, database servers, etc. that provide services to one or more of the clients 1202, 1206 and 1212. In particular, the configuration snapshot tool can be run locally on any one or more of the servers 1204, 1208, 1210, 1214 and 1216 for verifying or checking configuration of relevant components of a particular server or all servers on the system 1200.

Turning to FIG. 13, FIG. 13 shows an embodiment of a server that includes a configuration snapshot tool for verifying configuration of a computer system 1300 on a network (such as the network system 1200 shown in FIG. 12). The server 1300 includes a central processing unit (CPU) 1304, a local storage device 1302, a user interface 1306, a network interface 1308, a memory 1310, and a configuration snapshot tool 1320. The CPU 1304 is configured generally to execute operations within the server 1300. The user interface 1306, in one embodiment, is configured to allow a user to interact with the server 1300, including allowing input data and commands from a user and communicating output data to the user. The network interface 1308 is configured, in one embodiment, to facilitate network communications of the server 1300 over a communications channel of the network, such as, channel 1220 shown in FIG. 12). The local memory 1310 is configured, in one embodiment, to store several data and metadata files that may be used in conjunction with a configuration snapshot operation.

In a preferred embodiment, the configuration snapshot tool 1320 of the server 1300 includes a Write New File module 1322, a Check Components module 1324, a Delete Records module 1326, a Read Status File module 1328, a Update Components module 1330, a Add New Records module 1332, a Process Components module 1334, a Handle Component Output module 1336, a Check Old Data module 1338, and a Check New Data module 1340. The Write New File module is configured to create or generate a new configuration snapshot that is stored in a new status file (New file) that contains new configuration data corresponding to any new components or changed configurations of components in a system, as defined in the configuration file(s). The Check Components module 1324 is configured to check existing components as well as any new components that are added to the system. The Delete Records module 1326 is configured to delete records pertaining to components whose configuration data is not relevant to the functional operation of the system. The Read Status File module 1328 is configured to read the existing configuration data for the components of a system that was previously recorded in the existing or old status file. The Update Components module 1330 is configured to remove components whose configurations are not to be checked from the list of components defined in configuration files and to add components whose configurations are to be checked to the list of components defined in configuration files for generating a configuration snapshot for a system. The Add New Records module 1332 is configured to add to the existing or old status file new records that correspond to new components or components whose configuration have changed. The Process Components module 1334 is configured to process configuration data for each component including sub-components defined in the configuration file. The Handle Component Output module 1336 is configured to handle or process the output from each of the component scripts run to check configuration of each corresponding component in the system. The Check Old Data module 1338 is configured to compare old or existing configuration data with current or new configuration data. The Check New Data module 1340 is configured to compare new or current configuration data with old or existing configuration data.

In a preferred embodiment, the memory 1310 includes one or more configuration files 1312 and one or more status files or logs 1314, including any new status files that log configurations of a system over a period of time. In this way, the status file facilitates reviewing configuration history of a system, as well as possibly restoring a system or recreating a system that existed prior to a failure or scheduled maintenance event. The configuration files, in one embodiment, store a list of components, including sub-components in the system whose configuration is to be checked by the configuration snapshot tool. As such, a configuration file can store a different list of components depending on the purpose or function of the system. Alternatively, the configuration files 1312 and the status files 1314 may be stored in the storage system 1302.

In yet another embodiment, the present invention provides a computer program product for checking configuration of a system. The computer program product comprises a computer readable or computer-usable medium, which provides program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. Preferably, the computer storage medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Further, preferably, network medium can comprise of transmission devices on a network, such as, cables, routers, switches and/or network adapter cards.

Preferably, the computer program product is in a form accessible from the computer-usable or computer-readable medium, which provides program codes or instructions for use by or in connection with a computer or any instruction execution system. For the purposes of this description, a computer-usable or computer readable medium can be any apparatus that can contain, store, communicate, propagate, or transport the codes or instructions for use by or in connection with the instruction execution system, apparatus, or device. Preferably, the medium can comprise an electronic, magnetic, optical, electromagnetic, infrared, or semiconductor system (or apparatus or device) or a propagation medium. More preferably, the computer-readable medium can comprise a semiconductor or solid state memory, magnetic tape, a removable computer diskette, a random access memory (RAM), a read-only memory (ROM), a rigid magnetic disk and an optical disk. Further, examples of optical disks include compact disc-read only memory (CD-ROM), compact disc-read/write (CD-R/W) and digital versatile/video disc (DVD). The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

In an embodiment, the computer program product includes first program instructions to generate, using a configuration checking tool, an initial point-in-time configuration snapshot of a system among a plurality of systems connected via a network, the configuration checking tool including in the initial point-in-time configuration snapshot each relevant component among a set of relevant components of the system that affect a functional level of operation of the system. The computer program product further includes second program instructions to run the configuration checking tool at a later time to generate a later point-in-time configuration snapshot of the system, the second program instructions include instructions to compare the later point-in-time configuration snapshot to the initial point-in-time configuration snapshot to identify one or more critical configuration changes and to identify one or more significant configuration changes to any relevant component among the set of relevant components from the initial point-in-time configuration snapshot to the later point-in-time configuration snapshot. Further, the computer program product includes third program instructions to alert, using specific error messages, of the one or more critical configuration changes identified and to inform, using specific warning messages, of the one or more significant configuration changes identified for the system, the instructions excluding identifying any insignificant configuration changes that do not significantly affect the functional level of operation of the system. In an embodiment, the first program instructions include instructions to run a component script corresponding to a component of the set of relevant components defined for the computer system whose configuration is to be checked. Moreover, in an embodiment, the second program instructions include instructions to check dynamic and persistent routes, to check communication to default gateways and servers, to check system clock, to check error log for hardware and software errors, to check load balancing systems, and to check failover systems. In an embodiment, the computer program product includes fourth program instructions to define in a configuration file the set of relevant components whose configuration is to be checked by the configuration snapshot tool. Preferably, each of the first, second, third and fourth program instructions are stored on the computer readable medium. Further, in an embodiment, the set of relevant components includes at least one of: operating system components, hardware components, disk storage components and network components. Furthermore, in an embodiment, the initial point-in-time configuration snapshot is before a reboot of the system and the later point-in-time configuration snapshot is after a reboot of the system.

In an embodiment, the configuration snapshot tool includes the following component scripts for checking configuration of corresponding operating system components, as follows: operating system (OS) level (provides OS level and gives an error message if the OS level has changed), paging space (gets paging information and gives an error message if paging space has changed or is missing), maintenance level (provides filesets for each maintenance level; gives an error message if the maintenance level has changed or gives a warning message if not all filesets are found for a particular maintenance level), system dumps (provides a list of dump device settings and gives an error message if a dump setting has changed or is missing), bootlist (provides a list of boot devices and gives an error message if the bootlist has changed or is missing, run level (provides current run level and gives an error message if a run level has changed or is missing), system attributes (provides a list of system attributes and gives an error message if a system attribute has changed or is missing), bootinfo (provides kernel information for each boot device and gives an error message if the kernel information has changed or is missing), DCE/DFS (provides DCE/DFS (Distributed Computing Environment/Distributed File Service) status and gives an error message if the statistics or any of the DCE/DFS components have changed or are missing), check date for forward progress (compares the current datestamp with previous datestamp and gives an error message if previous datestamp is newer than the current datestamp), vmtune options (gets virtual memory manager tunable parameters, gives an error if any of the parameters have changed or are missing), Inetd (provides a checksum and byte count of an Inetd file and gives an error message if the Inetd file has changed), biod processes (gets the number of biod processes running and gives an error message if the number changes), I/O completion ports (gets settings for I/O completion ports and gives an error message if any of the settings have changed or are missing), licensed products (provides the number of fixed licenses and the status of floating licensing and gives an error if the status or the number changes), running processes (gets a list of running processes and gives an error message if any of the processes are missing; can ignore certain processes by putting it in the ignore file), TSM scheduler (Tivoli Storage Manager scheduler software from IBM Corporation—makes sure that the TSM scheduler is operational, gives a warning message if the TSM scheduler is not running and gives an error message if the status of the TSM scheduler has changed), HACMP (gets HACMP resources (High Availability Cluster Multi-Processing software from IBM Corporation) and gives a warning message if HACMP is not installed, configured and an error message if any of the resources have changed or are missing and gives a warning message if HACMP is not installed or not configured; also automatically creates separate configuration files for different HACMP resource configurations), NFS tuning options (gets the NFS tuning parameter settings and gives an error message if any of the parameters change), sendmail (gets the checksum and byte count of sendmail files and gives an error message if any of the files have changed or are missing), asynchronous I/O settings (gets asynchronous I/O settings and gives an error message if any of the settings have changed or are missing and gives a warning message if the file is not installed), and network dispatcher (gets network dispatcher ports and high availability status; gives an error message if any of the data has changed or is missing and gives a warning message if network dispatcher is not installed; automatically creates separate configuration files for different network dispatcher resource configurations). In an embodiment, the configuration snapshot tool includes the following component scripts for checking configuration of corresponding hardware components, as follows: CPU (provides list of processors and status and gives an error message if a CPU is missing and a warning message if CPU is not enabled), real memory (provides amount of real memory and gives an error message if the amount of real memory has changed), console (provides a list of consoles and attributes and gives an error message if any of the console attributes are missing or changed), tape drives (provides list of tape drives and gives an error message if a tape drive has changed or is missing), SAN Vpaths (provides status of all SAN (storage area network) devices, and gives a warning message if no SAN devices are found and gives an error message if any of the SAN devices have changed or are missing), SSA (Serial Storage Architecture) Link verification (checks operational status of links forming an SSA loop, and gives an error message when it is discovered that an SSA loop has been broken) and Error reporting (gets error reporting messages and gives an error if any new error messages are detected).

In an embodiment, the configuration snapshot tool includes the following component scripts for checking configuration of corresponding disk storage components, as follows: NFS Mounted Filesystems (provides a list of NFS mounted filesystems, and gives an error message if an NFS filesystem is missing), Filesystem Mount Options (provides a list of filesystem mount options and gives an error message if one of the mount attributes has changed or is missing), Filesystems (provides a list of mounted filesystems, and gives an error message if a filesystem is missing), Volume Groups (gets a list of volume groups and their attributes, gives an error message if one of the attributes has changed or if a volume group is missing), SSA Raid (gets a list of SSA Raid devices and the status of each, gives an error message if any of the SSA devices has changed or is missing and gives a warning message if there are no SSA devices), and logical volumes (gets logical volume attributes and gives an error message if any of the attributes have changed or are missing). In an embodiment, the configuration snapshot tool includes the following component scripts for checking configuration of corresponding network components, as follows: default route (gets default route information and pings the default route specified in configuration file; gives an error message if default route has changed or is missing or if ping to the default route fails), network information (checks network information and gives an error message if any of the multiple fields of records have changed), network routes (provides list of network routes and gives an error message if a route has changed or is missing), nameserver information (gets list of name servers specified in configuration file and pings each one, gives an error message if any of the name servers or the domain have changed or if the ping to any of the name servers fails), IBM SNA™ LU Info (provides status of all IBM SNA™ (System Network Architecture) interfaces, IBM SNA™ LUs (Logical Units) and IBM SNA™ links, and gives a warning message if no SNA™ resources are found and gives an error message if any of the resources have changed or are missing), IBM SNA™ status (provides status of all IBM SNA™ LU connections and gives a warning message if IBM SNA™ is not installed and gives an error message if IBM SNA™ is not active or if any of the connections are down), NTPD (provides information about the current state of the network time protocol daemon (NTPD), gives an error message if the time server is not reachable or of the clock offset is greater than the customizable offset defined in configuration file and gives a waning message if the command to get time protocol information is not found), network tuning options (gets the network tuning parameter settings and gives an error message if any of the parameters change), and DNS (checks that domain name servers listed are operational and gives an error message if any of the domain name servers do not respond).

Referring now to FIG. 14, there is illustrated a system 1400 for checking configuration of a system, according to the present invention. As depicted, system 1400 includes a computer infrastructure 1402, which is intended to represent any type of computer architecture that is maintained in a secure environment (i.e., for which access control is enforced). As shown, infrastructure 1402 includes a computer system 1404 that typically represents a server or the like. It should be understood, however, that although not shown, other hardware and software components (e.g., additional computer systems, such as, additional servers, routers, firewalls, etc.) could be included in infrastructure 1402.

In general, an administrator 1430 interfaces with infrastructure 1402 to verify configuration of the computer system 1404. Similarly, one or more users and/or clients 1440 and 1442 can interface with infrastructure 1402 to verify configuration of the computer system 1404. To this extent, infrastructure 1402 provides a secure environment. In general, the parties could access infrastructure 1402 directly, or over a network via interfaces (e.g., client web browsers) loaded on computerized devices (e.g., personal computers, laptops, handheld devices, etc., not shown in FIG. 14). In the case of the latter, the network can be any type of network such as the Internet, a local area network (LAN), a wide area network (WAN), a virtual private network (VPN), etc. In any event, communication with infrastructure 1402 could occur via a direct hardwired connection (e.g., serial port), or via an addressable connection that may utilize any combination of wire line and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, the parties could utilize an Internet service provider to establish connectivity to infrastructure 1402. It should be understood that under the present invention, infrastructure 1402 could be owned and/or operated by a party such as provider 1444, or by an independent entity. Regardless, use of infrastructure 1402 and the teachings described herein could be offered to the parties on a subscription or fee-basis. In either scenario, an administrator at an administrative server or any other designated computer system (reference numeral 1430) could support and configure infrastructure 1402.

Computer system 1404 is shown to include a CPU (hereinafter "processing unit 1406"), a memory 1412, a bus 1410, and input/output (I/O) interfaces 1408. Further, computer system 1400 is shown in communication with external I/O devices/resources 1424 and storage system 1422. In general, processing unit 1406 executes computer program codes, such as the configuration snapshot tool 1414 that is stored in memory 1410 and could be stored in storage system 1422. While executing the configuration snapshot tool or program 1414, the processing unit 1406 can read and/or write data, to/from memory 1412, storage system 1422, and/or I/O interfaces 1408. Bus 1410 provides a communication link between each of the components in computer system 1400. External devices 1424 can comprise any devices (e.g., keyboard, pointing device, display, etc.) that enable a user to interact with computer system 1400 and/or any devices (e.g., network card, modem, etc.) that enable computer system 1400 to communicate with one or more other computing devices.

Computer infrastructure 1402 is only illustrative of various types of computer infrastructures for implementing the invention. For example, in one embodiment, computer infrastructure 1402 comprises two or more computing devices (e.g., a server cluster) that communicate over a network to perform the various process steps of the invention. Moreover, computer system 1400 is only representative of various possible computer systems that can include numerous combinations of hardware. To this extent, in other embodiments, computer system 1400 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 1406 may comprise a single processing unit, or be distributed across one or more processing units in one or more locations, e.g., on a client and server. Similarly, memory 1412 and/or storage system 1422 can comprise any combination of various types of data storage and/or transmission media that reside at one or more physical locations. Further, I/O interfaces 1408 can comprise any system for exchanging information with one or more external devices 1424. Still further, it is understood that one or more additional components (e.g., system software, math co-processing unit, etc., not shown in FIG. 14) can be included in computer system 1400. However, if computer system 1400 comprises a handheld device or the like, it is understood that one or more external devices 1424 (e.g., a display) and/or storage system(s) 1422 could be contained within computer system 1400, and not externally as shown. Storage system 1422 can be any type of system (e.g., a database) capable of providing storage for information under the present invention. To this extent, storage system 1422 could include one or more storage devices, such as a magnetic disk drive or an optical disk drive. In another embodiment, storage system 1422 includes data distributed across, for example, a local area network (LAN), wide area network (WAN) or a storage area network (SAN) (not shown). Although not shown, additional components, such as cache memory, communication systems, system software, etc., may be incorporated into computer system 1400.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of verifying configuration of a computer system, said method comprising the steps of:
   generating a first point-in-time configuration snapshot containing a first set of configuration data corresponding to a first configuration of each of a set of relevant components of a computer system checked at a first point-in-time, said first point-in-time configuration snapshot being written to a status file;
   generating a second point-in-time configuration snapshot containing a second set of configuration data corresponding to a second configuration of said each of said set of relevant components of said computer system checked at a second point-in-time;
   comparing said first set of configuration data to said second set of configuration data to identify one or more critical configuration changes and to identify one or more significant configuration changes and to exclude identifying any insignificant configuration changes that do not significantly effect an acceptable level of operation and an intended purpose of said computer system; and
   alerting as to each of said one or more critical configuration changes identified, while informing as to each of said one or more significant configuration changes identified for said computer system.

2. The method according to claim 1, wherein each of said generating steps comprises the step of:
   providing a configuration snapshot tool for generating said first point-in-time configuration snapshot and said second point-in-time configuration snapshot for said computer system.

3. The method according to claim 2, further comprising the step of:
   defining in a configuration file each of said set of relevant components whose configuration data is to be checked by said configuration snapshot tool for generating each of said first point-in-time configuration snapshot and said second point-in-time configuration snapshot for said computer system.

4. The method according to claim 3, wherein each of said generating steps comprises the step of:
   running a component script corresponding to a component of said set of relevant components defined for said computer system whose configuration is to be verified.

5. The method according to claim 4, wherein said comparing step further comprises the steps of:
   identifying one or more dynamic routes that may have changed from said first point in time configuration snapshot to said second point in time configuration snapshot, wherein said one or more dynamic routes do not cause any corresponding loss in function associated with said one or more dynamic routes; and
   identifying one or more persistent routes that should remain the same from said first point in time configuration snapshot to said second point in time configuration snapshot in order to prevent any corresponding loss in function associated with said one or more persistent routes.

6. The method according to claim 5, wherein said defining step further comprises the step of:
   adding one or more new relevant components to said set of relevant components defined in said configuration file for verifying configuration of each of said one or more new relevant components added.

7. The method according to claim 6, wherein said defining step further comprises the step of:
   deleting one or more existing components from said set of relevant components defined in said configuration file for excluding verifying configuration of each of said one or more existing components deleted.

8. The method according to claim 7, wherein said set of relevant components comprises at least one of: operating system components, hardware components, disk storage components and network components; and wherein said first point-in-time configuration snapshot is before a reboot of said system; and wherein said second point-in-time configuration snapshot is after a reboot of said system.

9. A system for checking configuration of a server on a computer network, comprising:
   a plurality of servers coupled to a computer network, each server of said plurality of servers comprising of one or more relevant components for performing an intended function of said each server; and
   a configuration snapshot tool for creating an initial point-in-time configuration snapshot of a server of said plurality of servers in said computer network, said configuration snapshot tool being configured to run on said server and to exclude in creating said initial point-in-time configuration snapshot any non-relevant components of said one or more relevant components of said server that do not effect said intended function of said remote server, said configuration snapshot tool being configured to compare said initial point-in-time configuration snapshot to a later point-in-time configuration snapshot in order to identify any critical configuration changes and any significant configuration changes in said one or more relevant components that may affect said intended function of said server; wherein said initial point-in-time configuration snapshot is before a reboot of said server and wherein said later point-in-time configuration snapshot is after a reboot of said server.

10. The system according to claim 9, wherein said configuration snapshot tool is further configured to read from a configuration file that specifies a list of said one or more relevant components whose configuration is to be checked for creating said initial point-in-time configuration snapshot and said later point-in-time configuration snapshot of said server.

11. The system according to claim 10, wherein said configuration snapshot tool is further configured to run a component script corresponding to a relevant component of said set of relevant components whose configuration is to be checked.

12. The system according to claim 11, wherein said configuration snapshot tool is further configured to add one or more additional components to said set of relevant components specified in said configuration file for verifying configuration of said one or more additional components added.

13. The system according to claim 12, wherein said configuration snapshot tool is further configured to delete one or more existing components from said set of relevant components specified in said configuration file for excluding verifying configuration of each of said one or more existing components deleted.

14. The system according to claim 13, wherein said set of relevant components comprises at least one of: operating system components, hardware components, disk storage components and network components.

15. A computer program product for checking configuration of a computer system, said computer program product comprising:

a computer readable storage medium;

first program instructions to generate, using a configuration checking tool running on said computer system, an initial point-in-time configuration snapshot of said computer system among a plurality of networked computer systems connected via a network, said configuration checking tool including in said initial point-in-time configuration snapshot each relevant component among a set of relevant components of said computer system that affects a functional level of operation of said computer system;

second program instructions to run said configuration checking tool at a later time to generate a later point-in-time configuration snapshot of said computer system, said second program instructions include instructions to compare said later point-in-time configuration snapshot to said initial point-in-time configuration snapshot to identify one or more critical configuration changes and to identify one or more significant configuration changes to any relevant component among said set of relevant components from said initial point-in-time configuration snapshot to said later point-in-time configuration snapshot;

third program instructions to alert, using specific error messages, of said one or more critical configuration changes identified and to inform, using specific warning messages, of said one or more significant configuration changes identified for said computer system, said instructions excluding identifying any insignificant configuration changes that do not significantly affect said functional level of operation of said computer system; and wherein said first, second and third program instructions are stored on said computer readable storage medium for execution by a central processing unit of said computer system.

16. The computer program product according to claim 15, further comprising:

fourth program instructions to define in a configuration file said set of relevant components whose configuration is to be checked by said configuration checking tool, said fourth program instructions including instructions to add a component to said configuration file and instructions to delete a component from said configuration file; said fourth program instructions being stored on said computer readable storage medium for execution by a central processing unit of said computer system.

17. The computer program product according to claim 16, wherein said first program instructions include instructions to run a component script corresponding to a component of said set of relevant components defined for said computer system whose configuration is to be checked.

18. The computer program product according to claim 17, wherein said second program instructions include instructions to check dynamic and persistent routes, to check communication to default gateways and servers, to check system clock, to check error log for hardware and software errors, to check load balancing systems, and to check failover systems.

19. The computer program product according to claim 18, wherein said initial point-in-time configuration snapshot is before a reboot of said computer system; and wherein said later point-in-time configuration snapshot is after a reboot of said computer system.

20. The computer program product according to claim 19, wherein said set of relevant components comprises at least one of: operating system components, hardware components, disk storage components and network components.

* * * * *